United States Patent
Dudar

(10) Patent No.: US 10,563,605 B2
(45) Date of Patent: Feb. 18, 2020

(54) SYSTEMS AND METHODS FOR REDUCING VEHICLE EMISSIONS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/920,226

(22) Filed: Mar. 13, 2018

(65) Prior Publication Data
US 2019/0285017 A1 Sep. 19, 2019

(51) Int. Cl.
| | |
|---|---|
| *F02D 41/02* | (2006.01) |
| *F02D 41/14* | (2006.01) |
| *F02D 41/06* | (2006.01) |
| *F02B 39/10* | (2006.01) |
| *F02D 13/02* | (2006.01) |
| *F02P 23/04* | (2006.01) |
| *F02B 37/18* | (2006.01) |
| *F02D 41/00* | (2006.01) |

(52) U.S. Cl.
CPC .......... *F02D 41/1494* (2013.01); *F02B 37/18* (2013.01); *F02B 39/10* (2013.01); *F02D 13/0242* (2013.01); *F02D 41/0002* (2013.01); *F02D 41/064* (2013.01); *F02D 41/1454* (2013.01); *F02P 23/04* (2013.01); *F02D 2013/0292* (2013.01); *F02D 2250/06* (2013.01)

(58) Field of Classification Search
CPC ...... F02P 17/00; F02P 17/12; F02P 2017/123; F02P 23/04; F01N 13/009; F01N 3/021; F01N 3/2006; F01N 3/2026; F01N 3/22; F01N 3/30; F01N 3/323; F01N 9/00; F01N 2900/0602; F01N 2900/08; F01N 2900/1411; F01N 2900/1602; F02D 31/002; F02D 41/024; F02D 41/029; F02D 2200/0812; F02D 41/0205; F02N 2200/026

See application file for complete search history.

(56) References Cited

U.S. PATENT DOCUMENTS

| | | | | |
|---|---|---|---|---|
| 4,543,176 | A | * 9/1985 | Harada | G01N 27/4067 204/406 |
| 4,655,182 | A | 4/1987 | Nakano et al. | |
| 5,454,259 | A | * 10/1995 | Ishii | F02D 41/1443 73/114.72 |

(Continued)

*Primary Examiner* — Jason D Shanske
*Assistant Examiner* — Matthew T Largi
(74) *Attorney, Agent, or Firm* — Geoffrey Brumbaugh; McCoy Russell LLP

(57) ABSTRACT

Methods and systems are provided for reducing release of undesired emissions to atmosphere at a start event of an engine configured to propel a vehicle. In one example, a method comprises providing an alternative heat source and actively routing heat from the alternative heat source to a heated exhaust gas oxygen sensor for which a heating element configured to raise temperature of the sensor is known to be degraded. In this way, a desired air-fuel ratio may be attained during engine start events where the heating element for raising temperature of the sensor is degraded, which may thus reduce tail-pipe emissions which may otherwise be released in the absence of such mitigating action.

16 Claims, 11 Drawing Sheets

(56) References Cited

U.S. PATENT DOCUMENTS

| | | | | |
|---|---|---|---|---|
| 5,505,183 | A * | 4/1996 | Sinha et al. | F02D 41/1494 123/688 |
| 5,929,328 | A * | 7/1999 | Seidenfuss | F02D 41/1495 60/276 |
| 6,481,428 | B1 | 11/2002 | Makki et al. | |
| 8,297,248 | B2 | 10/2012 | Martin et al. | |
| 8,919,313 | B2 * | 12/2014 | Weinrotter | F02P 23/04 123/143 B |
| 10,358,994 | B1 * | 7/2019 | Dudar | |
| 2003/0154053 | A1 * | 8/2003 | Saga | F02D 41/1494 702/185 |
| 2004/0007403 | A1 * | 1/2004 | Tomatsuri | B60K 3/00 180/65.235 |
| 2004/0099528 | A1 * | 5/2004 | Hattori | G01N 27/4175 204/401 |
| 2008/0307851 | A1 * | 12/2008 | Smith | F02D 41/1446 73/1.06 |
| 2009/0025371 | A1 * | 1/2009 | Hermansson | B60K 6/445 60/286 |
| 2011/0283675 | A1 * | 11/2011 | Gonze | F01N 3/021 60/274 |
| 2012/0291760 | A1 * | 11/2012 | Vigild | F02M 31/13 123/542 |

* cited by examiner

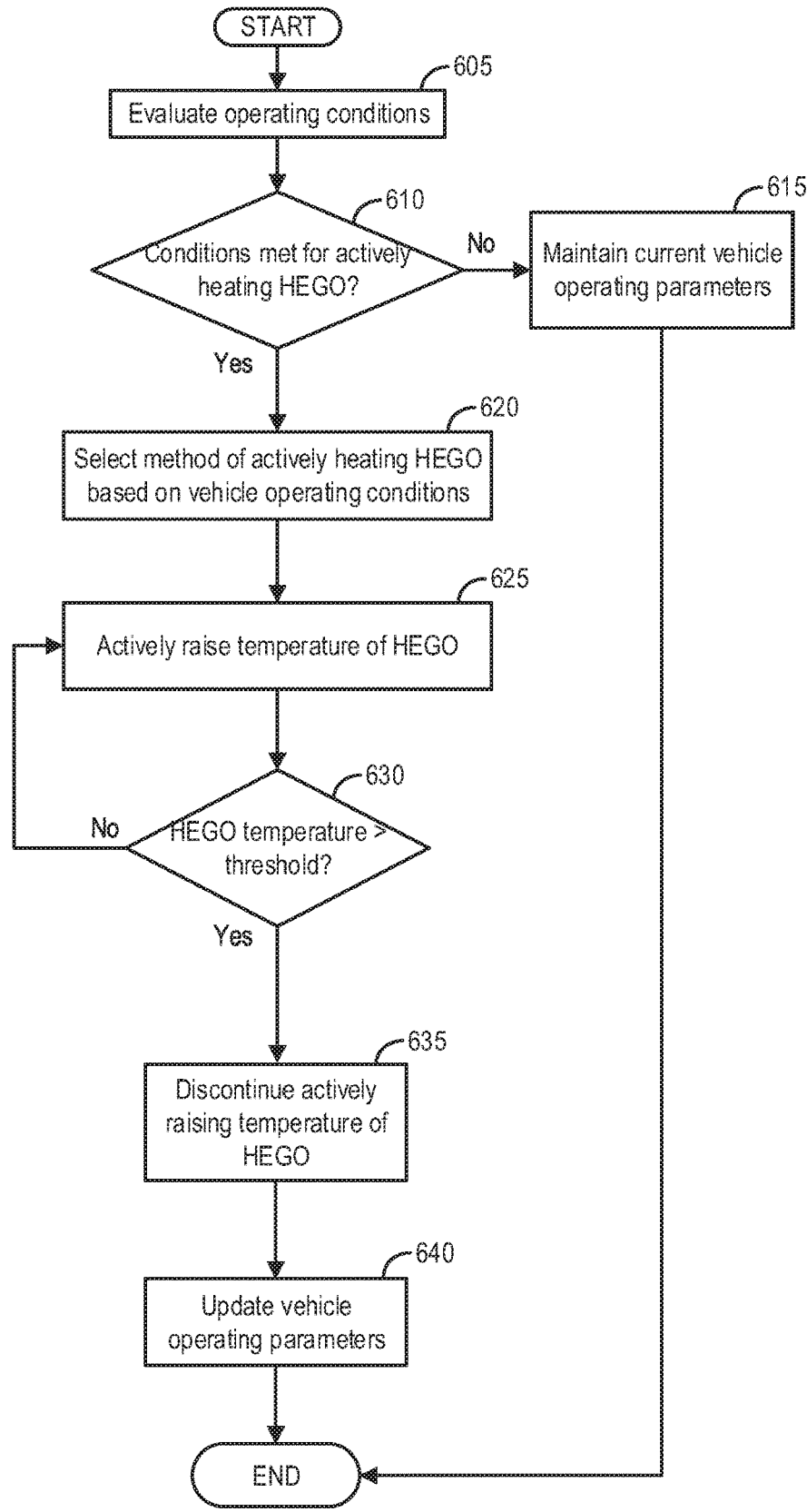

SYSTEMS AND METHODS FOR REDUCING VEHICLE EMISSIONS

FIELD

The present description relates generally to methods and systems for controlling a vehicle engine to actively raise a temperature of a heated exhaust gas oxygen (HEGO) sensor at engine start events under conditions where an HEGO heater is degraded.

BACKGROUND/SUMMARY

At a cold-start event, vehicles may be in open-loop fuel control until a heated exhaust gas oxygen sensor (HEGO) or sensors warm up in order to indicate a status of air-fuel ratio. During such open-loop control, tailpipe emissions may be higher than desired, as the air-fuel ratio may not be at the optimal stoichiometric air-fuel ratio (e.g. 14.7:1). Once the HEGO sensor(s) heat up to operating temperature, then open-loop control may be terminated, and closed-loop control may become active, where HEGO sensor(s) are used to adjust fueling so as to attain/maintain the optimal air-fuel ratio. Furthermore, catalytic converters on many current non-hybrid vehicles are lit off by engine combustion heat, which may take a few seconds before combustion byproduct gases may be oxidized via the catalyst.

Such issues may be exacerbated in hybrid electric vehicles (HEVs) and/or vehicles equipped with Start/Stop (S/S) capabilities, where the engine may pull down (e.g. be deactivated to stop combusting air and fuel) when vehicle speed decreases to below a threshold speed. More specifically, for HEVs and/or S/S vehicles, there may be portions of particular drive cycles where the engine may be off (e.g. not combusting air and fuel), and during such modes (e.g. electrical operation or idle stops), catalyst and/or HEGO temperature may cool to below the desired operating temperatures. Thus, in such examples, on an ensuing engine start event, there may be increased levels of emissions until the catalyst and/or HEGO sensor(s) warm up to their desired operating temperatures.

Thus, due to such issues, recent advancements to powertrains for HEVs and S/S vehicles have focused on electrically heated catalysts (EHCs) and HEGO heating elements. In other words, EHCs may include heating elements inside them in order to light off the catalyst independently of engine combustion waste heat. Similarly, HEGO heating elements may raise temperature of the HEGO sensor(s) independently of combustion waste heat.

However, HEGO heating elements, or HEGO heaters, may be prone to degradation as they are positioned in the harsh environment of the exhaust stream. When such HEGO heaters become degraded, the HEGO sensor(s) may take much longer to warm up, as the warming becomes solely reliant on engine waste heat, rather than the active heating from its own HEGO heating element. In such a case, the additional time to warm up the HEGO sensor(s) may result in increased levels of tailpipe emissions at a cold-start or under conditions where the HEGO sensor temperature has decreased to below the desired temperature at a S/S event.

The inventors herein have recognized the above-mentioned issues, and have developed systems and methods to address them. In one example, a method comprises reducing undesired emissions at a start event of an engine that propels a vehicle under conditions where a temperature of a heated exhaust gas oxygen sensor is below its desired operating temperature and where a heating element configured to heat the sensor is degraded, by providing an alternative heat source and actively routing heat from said source to the sensor to raise the temperature of the sensor to its desired operating temperature. In this way, emissions may be improved by enabling the exhaust gas oxygen sensor to reach its desired operating temperature for the start event of the engine, to enable closed-loop fuel control faster, even under conditions where the heating element configured to heat the sensor is degraded.

As one example, the start event comprises a cold-start event, and in another example, the start even comprises a start/stop event where the temperature of the sensor has decreased to below its desired operating temperature while the engine is not combusting air and fuel.

An another example, reducing undesired emissions includes reducing undesired emissions at the start event as compared to conditions where the heated exhaust gas oxygen sensor remains below its desired operating temperature for the start event.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 depicts a high-level example methodology for actively raising a temperature of an HEGO sensor as a function of current vehicle operating conditions.

DETAILED DESCRIPTION

The following description relates to systems and methods for actively raising temperature of HEGO sensors positioned either upstream of an emissions control device, or downstream of the emissions control device, at S/S events or cold-start events, where heating elements coupled to said HEGO sensors are determined to not be functioning as desired or expected. Such methodology may include unfueled engine rotation or rotation of an electric booster to route heat from an alternative source, to the particular HEGO sensor whose heating element is degraded. Accordingly, such methodology may be conducted in a hybrid electric vehicle, such as the vehicle/engine system depicted at FIGS. 1-2, where such a vehicle may include an electric booster as depicted in the engine system depicted at FIG. 3. In one example, the alternative heat source may be from a heater coupled to the emissions control device, whereas in another example, the alternative heat source may be provided via laser ignition devices, such as that depicted at FIG. 4. Rotation of the engine or electric booster may be conducted via energy stored in an onboard energy storage device, and such rotation may include either forward or reverse rotation of the engine or electric booster, depending on particular methodology selected for increase temperature of the selected HEGO sensor. Thus, H-bridge circuitry, such as that depicted at FIGS. 5A-5B, may be employed for forward/reverse rotation of the engine or electric booster.

A method for actively raising temperature of an HEGO sensor positioned either upstream or downstream is depicted at FIG. 6. Such a method may include the controller assessing current vehicle operating conditions and particular componentry included in such a vehicle's engine system. Accordingly, FIGS. 7-11 depict various timelines for conducting the different types of active HEGO heating methodology discussed in detail at FIG. 6.

Figure 1:
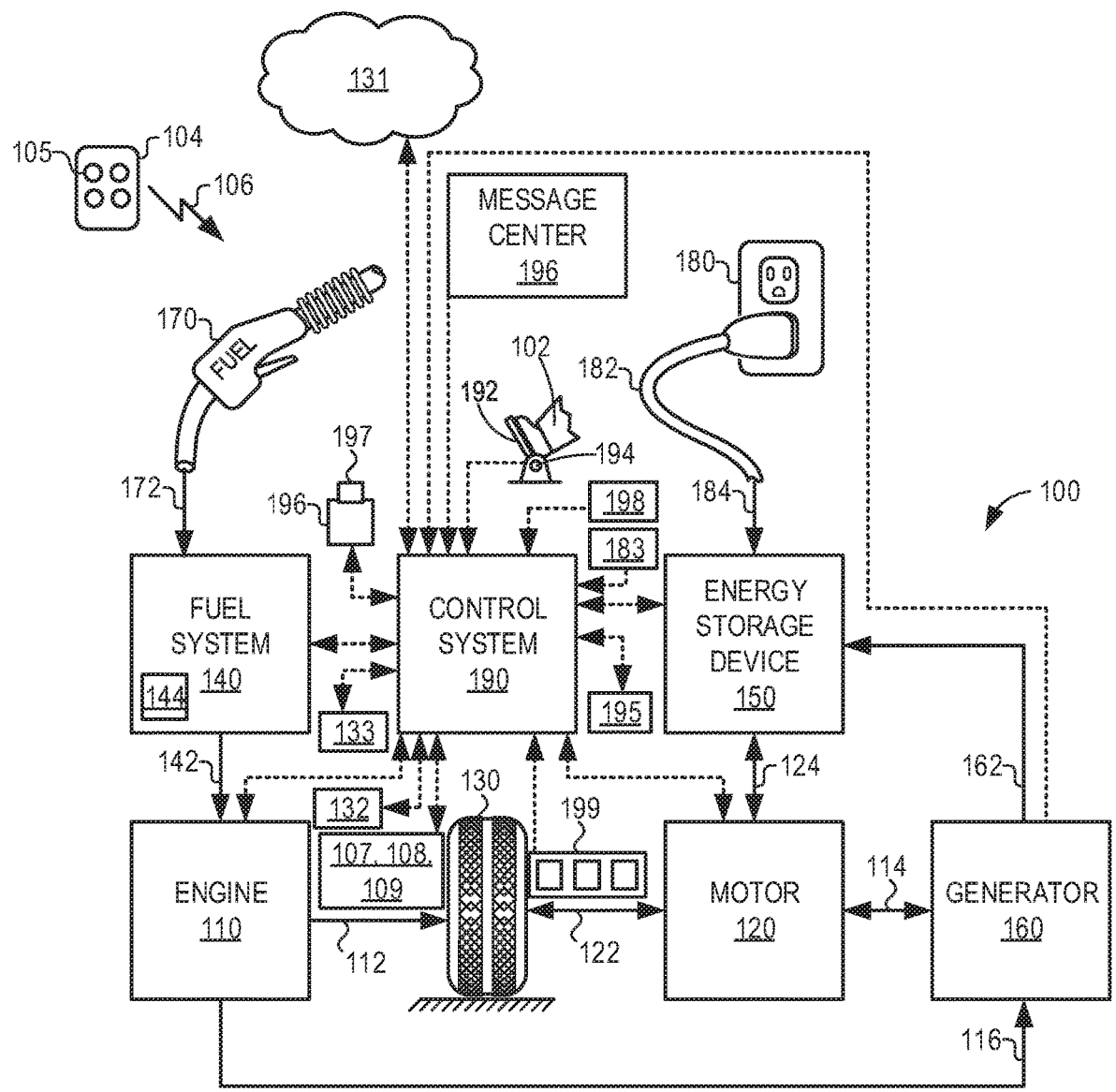
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the engine 110 in an unfueled configuration. More specifically, motor 120 may rotate the engine unfueled, using power from onboard energy storage device 150, which may include a battery, capacitor, super-capacitor, etc., for example. In a case where motor 120 is used to rotate the engine unfueled, fuel injection to engine cylinders may be prevented, and spark (or in some examples laser-based ignition) may not be provided to each of the engine cylinders. As will be discussed in further detail below, the engine may in some examples be spun or rotated unfueled, in a forward or default direction, whereas in other examples, the engine may be spun or rotated unfueled in a reverse direction. For example, an H-bridge circuit (see FIGS. 5A-5B) may be utilized to spin the engine in a forward or reverse direction. Still further, while not illustrated at FIG. 1 (but see FIG. 3), the vehicle propulsion system may in some examples include an electric booster, or electric compressor, which may similarly be controlled via the motor to rotate in either a forward or reverse orientation.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operator input to shut down the engine, if selected idle-stop conditions, or in other words a set of predetermined conditions, are met. These may include, for example, engine torque demand being less than a threshold, vehicle speed below a threshold vehicle speed (e.g. 5 mph), the onboard energy storage device being sufficiently charged (e.g. charged greater than a threshold charge state), no request being received for air-conditioning, cabin-heating, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions may be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160, etc., responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, the fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. As one example, route-learning methodology may comprise information related to learned duration of stops along learned driving routines, where the engine may be stopped as a result of the S/S feature. In some examples, such learned duration of stops where the engine may be shut down may include information acquired wirelessly via the control system (via GPS and/or internet, V2V, V2I2V, etc.) where such information may include traffic light status (e.g. how long until a particular traffic light turns green), traffic conditions that relate to how long a particular stop may last, etc.

Vehicle system 100 may in some examples also include sensors dedicated to indicating the occupancy-state of the vehicle, for example seat load cells 107, door sensing technology 108, and onboard cameras 109.

Figure 2:
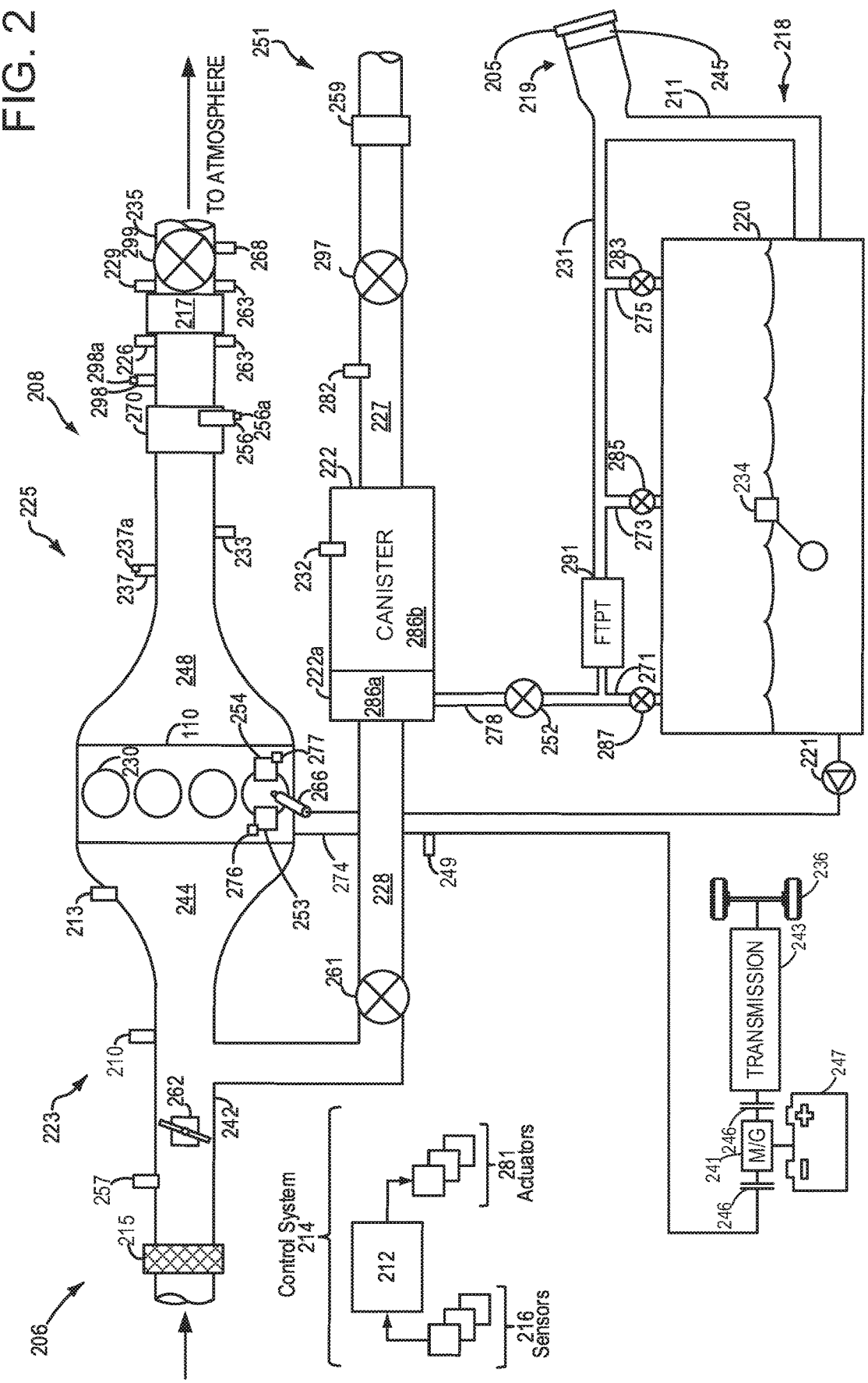
FIG. 2 schematically shows an example engine system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and filter 215 positioned upstream of throttle 262. The engine exhaust system 225 includes an exhaust manifold 248 leading to an exhaust passage 235 that routes exhaust gas to the atmosphere. The engine exhaust system 225 may include one or more emission control devices, or exhaust catalyst 270, which may be mounted in a close-coupled position in the exhaust. The one or more emission control devices may include a three-way catalyst, lean NOx trap, diesel particulate filter, oxidation catalyst, etc. In some examples, the one or more emission control devices may include an electric heater 256, the electric heater 256 configured to raise a temperature of the emission control device to a desired operating temperature (e.g. light-off temperature). The electric heater may be under control of controller 212, which may send a signal to an electric heater actuator 256a, thus actuating the electric heater on, or off.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Alternatively, MAP may be inferred from alternate engine operating conditions, such as mass air flow (MAF), as measured by MAF sensor 210 coupled to the intake manifold.

Engine exhaust system 225 may in some examples further include a gasoline particulate filter (GPF) 217. GPF 217 may comprise a particulate filter, hydrocarbon trap, a catalyzed wash coat, or combination thereof. In some examples, during operation of engine 110, GPF 217 may be periodically regenerated by operating at least one cylinder of the engine within a particular air-fuel ratio to increase a temperature of GPF 217, such that retained hydrocarbons and soot particles may be oxidized. While a GPF is illustrated at FIG. 2, it may be understood that in other examples, a diesel particulate filter (DPF) may instead be included in the vehicle propulsion system.

In some examples, temperature sensor 226 may be positioned upstream from the inlet of GPF 217 and temperature sensor 229 may be positioned downstream of GPF 217. Temperature sensors 226 and 229 may be used to assess the temperature of GPF 217 for regeneration purposes, for example. Furthermore, pressure in the exhaust system may be assessed by pressure sensor 263. Pressure sensor 263 may be a differential pressure sensor positioned upstream and downstream of GPF 217, for example. Pressure sensor 263 may be used to determine pressure at the inlet of GPF 217 in order to assess operating conditions for air to be introduced to the inlet of GPF 217 for regeneration. Furthermore, in some examples, soot sensor 268 may be positioned downstream of GPF 217, to assess the level of soot that is released from GPF 217. Soot sensor 268 may be used to diagnose operation of GPF 217, among other functions.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system.

Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more components for emissions control, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation, provided the fuel tank is coupled to the canister under such conditions). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. In some examples the FTIV may not be included, whereas in other examples, an FTIV may be included.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. As discussed, in some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, canister temperature sensor 232, MAF sensor 210, intake air temperature (IAT) sensor 257, pressure sensor 263, and catalyst monitor sensor (CMS) 298 also referred to as post-catalyst oxygen sensor. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, electric heater actuator 256a, etc. The controller may receive input data from the various sensors, process the input data, and trigger the actuators in response to the processed input data based on instruction or code programmed therein corresponding to one or more routines. Example control routines are described herein with regard to FIG. 6.

Exhaust gas sensor 237 may comprise a heated exhaust gas oxygen (HEGO) sensor. HEGO sensor 237 may further include a HEGO heating element 237a, under control of the controller, and which may serve to heat the HEGO sensor in order to raise temperature of the HEGO sensor to a desired operating temperature. While not explicitly shown, HEGO sensor 237 may include a temperature sensing element configured to determine temperature of the HEGO sensor.

CMS 298 may comprise another heated exhaust gas oxygen sensor, and may further include a CMS heating element 298a. CMS heating element 298a may be under control of the controller, and may serve to heat the CMS 298 in order to raise temperature of the CMS to its desired operating temperature. While not explicitly shown, CMS 298 may include a temperature sensing element configured to determine temperature of the CMS.

In some examples, the exhaust system may include an exhaust tuning valve 299, which may be under control of the controller, and actuatable to fully open or fully closed positions, or positions in-between fully open and fully closed.

As will be discussed in detail below, there may be circumstances where one or more of HEGO heating element 237a and/or CMS heating element 298a may become degraded. In such a situation, it may be desirable to use alternative methodology to actively raise temperature of the HEGO sensor 237 and/or CMS 298. Such methodology will be discussed in detail below with regard to FIG. 6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode. In some examples, a wakeup capability may enable a circuit to wake the controller in order to conduct diagnostics on the engine system, as will be discussed in further detail below.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Intake manifold 244 is coupled to combustion chambers or cylinders 230 through a series of intake valves 253. The combustion chambers are further coupled to exhaust manifold 248 via a series of exhaust valves 254. While only one intake and one exhaust valve is depicted at FIG. 2, it may be understood that each combustion chamber or cylinder may include an intake and exhaust valve. In the depicted embodiment, a single exhaust manifold 248 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, crankshaft 274 may include crankshaft sensor 249. In some examples, one or both of crankshaft sensor 249 and/or camshaft sensors (not shown) may be utilized to infer a position of one or more pistons coupled to the engine cylinders 230.

In some examples, engine 110 may comprise a variable displacement engine (VDE) where each cylinder of engine 110 may be selectively deactivatable, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 253 may be controlled by first VDE actuator 276 while deactivation of exhaust valve 254 may be controlled by second VDE actuator 277. In alternate embodiments, a single VDE actuator may control deactivation of both intake and exhaust valves of a deactivatable cylinder. In still other embodiments, a single cylinder valve actuator may deactivates a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. It may be further understood that, while the engine 110 is depicted as a VDE engine, the engine may in other examples not be a VDE engine without departing from the scope of this disclosure.

In some examples, vehicle system 206 may be a hybrid vehicle with multiple sources of torque available to one or more vehicle wheels 236 (e.g. 130). In the example shown, vehicle system 206 includes engine 110 and an electric machine 241. Electric machine 241 may be a motor (e.g. 120) or a motor/generator. Crankshaft 274 of engine 110 and electric machine 241 are connected via a transmission 243 to vehicle wheels 236 when one or more clutches 246 are engaged. In the depicted example, a first clutch is provided between crankshaft 274 and electric machine 241, and a second clutch is provided between electric machine 241 and transmission 243. Controller 212 may send a signal to an actuator (not shown) of each clutch 246 to engage or disengage the clutch, so as to connect or disconnect crankshaft from electric machine 241 and the components connected thereto, and/or connect or disconnect electric machine 241 from transmission 243 and the components connected thereto. Transmission 243 may be a gearbox, a planetary gear system, or another type of transmission. The powertrain may be configured in various manners including as a parallel, a series, or a series-parallel hybrid vehicle.

Electric machine 241 receives electrical power from a traction battery 247 (e.g. 150) to provide torque to vehicle wheels 130. Electric machine 241 may also be operated as a generator to provide electrical power to charge traction battery 247, for example during a braking operation.

Figure 3:
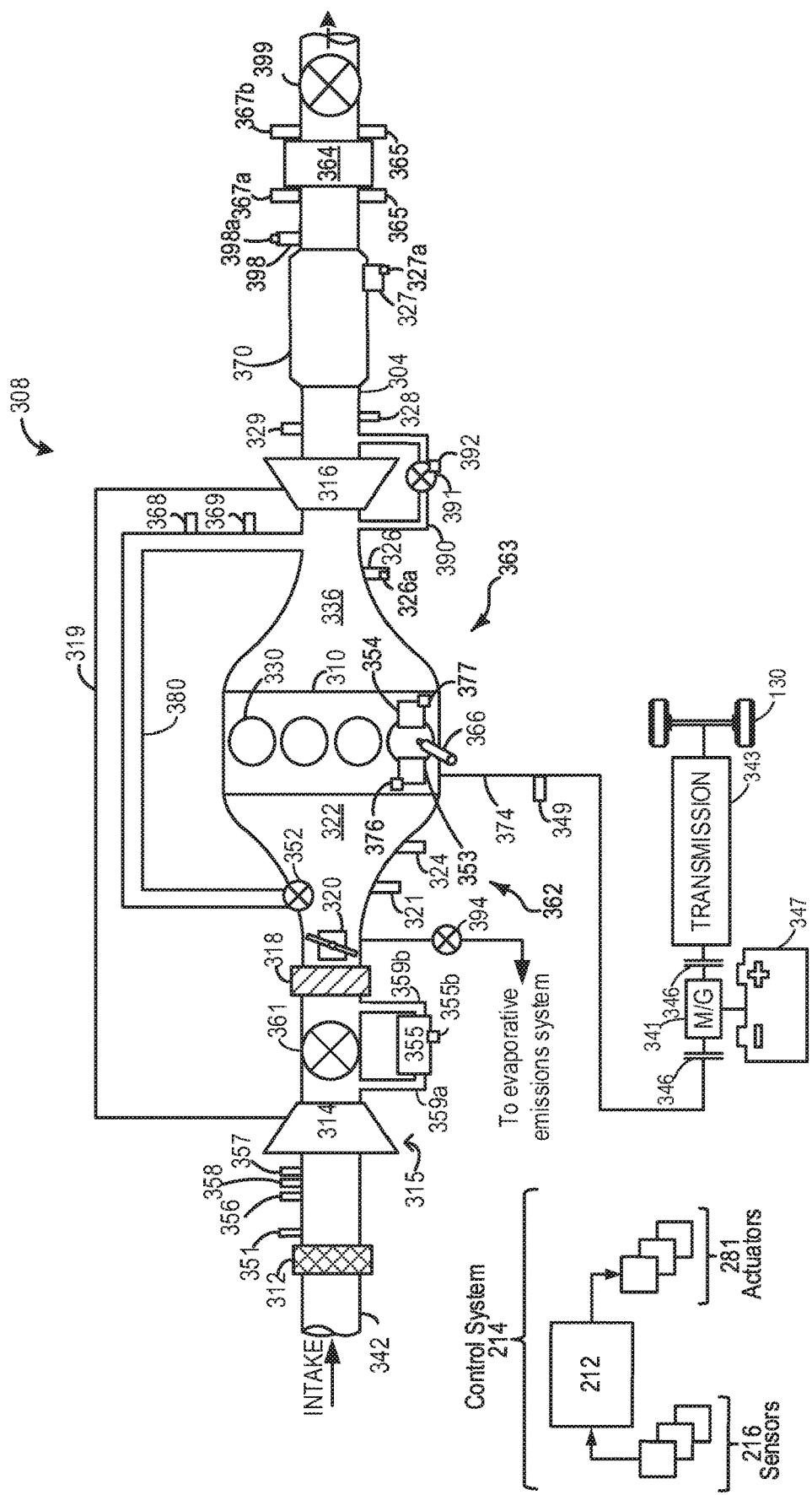
FIG. 3 schematically shows another example of an engine system including an electric booster.

Turning now to FIG. 3, it shows another example engine system 308. Engine system 308 may be included in vehicle propulsion system 206 (e.g. 100) without departing from the scope of this disclosure. It may be understood that many of the components of engine system 308 may also be included in engine system 206. The engine 310 (e.g. 110) includes an engine air intake system 362 (e.g. 223) and an engine exhaust system 363 (e.g. 225). In one example, the engine system 308 may be a diesel engine system. In another example, the engine system 308 may be a gasoline engine system. In the depicted embodiment, engine 310 is a boosted engine coupled to a turbocharger 315 including a compressor 314 driven by a turbine 316. Specifically, fresh air is introduced along intake passage 342 (e.g. 242) into engine 310 via air cleaner 312 (e.g. 215) and flows to compressor 314. The compressor may be any suitable intake-air compressor, such as a motor-driven or driveshaft driven supercharger compressor. In engine 310, the compressor is a turbocharger compressor mechanically coupled to turbine 316 via a shaft 319, the turbine 316 driven by expanding engine exhaust.

As shown in FIG. 3, compressor 314 is coupled through charge-air cooler (CAC) 318 to throttle valve 320 (e.g. 262). Throttle valve 320 is coupled to engine intake manifold 322 (e.g. 244). From the compressor, the compressed air charge flows through the charge-air cooler 318 and the throttle valve 320 to the intake manifold 322. In the embodiment shown in FIG. 3, the pressure of the air charge within the intake manifold 322 is sensed by manifold air pressure (MAP) sensor 324 (e.g. 213). In some examples, air flow in the intake manifold may be sensed via a mass air flow (MAF) sensor 321 (e.g. 210). Temperature of ambient air entering the intake passage 342 may be estimated via an intake air temperature (IAT) sensor 351 (e.g. 257).

One or more sensors may be coupled to an inlet of compressor 314. For example, a temperature sensor 358 may be coupled to the inlet for estimating a compressor inlet temperature, and a pressure sensor 356 may be coupled to the inlet for estimating a compressor inlet pressure. As another example, an ambient humidity sensor 357 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 392 may be actuated to open wastegate 391 to dump at least some exhaust pressure from upstream of the turbine to a location downstream of the turbine via wastegate 391. By reducing exhaust pressure upstream of the turbine, turbine speed can be reduced, which in turn helps to reduce compressor surge. Wastegate 391 may be positioned in a wastegate passage 390. The methodology discussed herein utilizes a wastegate that is actuatable open and closed, however, it is herein recognized that in some examples, a spring-loaded wastegate may be included in the vehicle system.

To assist the turbocharger 315, an additional electric intake air compressor, herein also referred to as an electric compressor or electric booster 355 may be incorporated into the vehicle propulsion system. Electric booster 355 may be powered via an onboard energy storage device (e.g. 150), which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device (e.g. 150).

In one example, electric booster 355 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 355 may be actuated off, or deactivated. More specifically, operational control of the electric booster 355 may be achieved based on command signals (e.g. duty cycle or pulse width signals) received from the vehicle controller (e.g. controller 212). For example, the controller may send a signal to an electric booster actuator 355b, which may actuate on the electric booster. In another example, the controller may send a signal to the electric booster actuator 355b, which may actuate off the electric booster. In one example the electric booster actuator may comprise an electric motor which drives the compression of air. In some examples, as will be discussed in detail below, the electric compressor may be rotated in a reverse direction. Reversing operation of the electric booster 355 may be achieved at least in part via an H-bridge circuit (see FIGS. 5A-5B).

Electric booster 355 may be positioned between a first electric booster conduit 359a, and a second electric booster conduit 359b. First electric booster conduit 359a may fluidically couple intake passage 342 to electric booster 355 upstream of electric booster bypass valve 361. Second electric booster conduit 359b may fluidically couple electric booster 355 to intake passage 342 downstream of electric booster bypass valve 361. As an example, air may be drawn into electric booster 355 via first electric booster conduit 359a upstream of electric booster bypass valve 361, and compressed air may exit electric booster 355 and be routed via second electric booster conduit to intake passage 342 downstream of electric booster bypass valve 361. In this way, compressed air may be routed to engine intake manifold 322. It may be understood that the above description relates to when the electric compressor is rotated in a forward direction. The electric compressor may in some examples be rotated in a reverse direction, which may thus result in compressed air being routed in the opposite direction, in other words, from the intake manifold (and in some examples the exhaust system) to atmosphere via intake passage 342.

In circumstances where the electric booster 355 is activated to provide boost more rapidly than if the turbocharger 315 were solely relied upon, it may be understood that electric booster bypass valve 361 may be commanded closed while electric booster 355 is activated. In this way, intake air may flow through turbocharger 315 and through electric booster 355. Once the turbocharger reaches the threshold speed, the electric booster 355 may be turned off, and the electric booster bypass valve 361 may be commanded open.

Intake manifold 322 is coupled to a series of combustion chambers 330 (e.g. 230) through a series of intake valves 353 (e.g. 253). The combustion chambers are further coupled to exhaust manifold 336 (e.g. 248) via a series of exhaust valves 354 (e.g. 254). In the depicted embodiment, a single exhaust manifold 336 is shown. However, in other embodiments, the exhaust manifold may include a plurality of exhaust manifold sections. Configurations having a plurality of exhaust manifold sections may enable effluent from different combustion chambers to be directed to different locations in the engine system.

As discussed above, in one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, it may be understood that vehicle system 308 may include a crankshaft 374 (e.g. 274) and may include a crankshaft sensor (e.g. 349). In some examples, one or both of the crankshaft sensor and/or camshaft sensors may be utilized to infer a position of one or more pistons coupled to the engine cylinders 330 (e.g. 230).

In some examples, engine 310 may comprise a variable displacement engine (VDE) where each cylinder of engine 310 may be selectively deactivatable, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 353 may be controlled by first VDE actuator 376 (e.g. 276) while deactivation of exhaust valve 354 may be controlled by second VDE actuator 377 (e.g. 277). In alternate embodiments, a single VDE actuator may control deactivation of both intake and exhaust valves of a deactivatable cylinder. In still other embodiments, a single cylinder valve actuator may deactivate a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Combustion chambers 330 may be supplied with one or more fuels, such as gasoline, alcohol fuel blends, diesel, biodiesel, compressed natural gas, etc., via injector 366 (e.g. 266). Fuel may be supplied to the combustion chambers via direct injection, port injection, throttle valve-body injection, or any combination thereof. In the combustion chambers, combustion may be initiated via spark ignition, laser ignition, and/or compression ignition.

As shown in FIG. 3, exhaust from the one or more exhaust manifold sections may be directed to turbine 316 to drive the turbine. The combined flow from the turbine and the wastegate then flows through emission control device 370 (e.g. 270). In one example, the emission control device 370 may be a light-off catalyst. In general, the exhaust after-treatment device 370 is configured to catalytically treat the exhaust flow, and thereby reduce an amount of one or more substances in the exhaust flow. For example, the exhaust after-treatment device 370 may be configured to trap NOx from the exhaust flow when the exhaust flow is lean, and to reduce the trapped NOx when the exhaust flow is rich. In other examples, the exhaust after-treatment device 370 may be configured to disproportionate NOx or to selectively reduce NOx with the aid of a reducing agent. In still other examples, the exhaust after-treatment device 370 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In some examples, the one or more emission control devices may include an electric heater 327 (e.g. 256), the electric heater 327 configured to raise a temperature of the emission control device to a desired operating temperature (e.g. light-off temperature). The electric heater may be under control of controller 212, which may send a signal to an electric heater actuator 327a, thus actuating the electric heater on, or off.

Engine exhaust system 363 may further include a gasoline particulate filter (GPF) 364 (e.g. 217). GPF 364 may comprise a particulate filter, hydrocarbon trap, a catalyzed wash coat, or combination thereof. In some examples, during operation of engine 310, GPF 364 may be periodically regenerated by operating at least one cylinder of the engine within a particular air-fuel ratio to increase a temperature of GPF 364, such that retained hydrocarbons and soot particles may be oxidized.

In some examples, temperature sensor 367a (e.g. 226) may be positioned upstream from the inlet of GPF 364 and temperature sensor 367b (e.g. 229) may be positioned downstream of GPF 364. Temperature sensors 367a and 367b may be used to assess the temperature of GPF 364 for regeneration purposes, for example. Furthermore, pressure in the exhaust system may be assessed by pressure sensor 365 (e.g. 263). Pressure sensor 365 may be a differential pressure sensor positioned upstream (closer to exhaust manifold) and downstream (farther from exhaust manifold) of GPF 364, for example. Pressure sensor 365 may be used to determine pressure at the inlet of GPF 364 in order to assess operating conditions for air to be introduced to the inlet of GPF 364 for regeneration. Furthermore, in some examples, a soot sensor may be positioned downstream of GPF 364, to assess the level of soot that is released from GPF 364. While a GPF is illustrated at FIG. 3, it may be understood that in some examples, a diesel particulate filter (DPF) may be included in the engine system 308, without departing from the scope of this disclosure.

In some examples, the exhaust system may include an exhaust tuning valve 399 (e.g. 299), which may be under control of the controller, and actuatable to fully open or fully closed positions, or positions in-between fully open and fully closed.

Exhaust gas recirculation (EGR) delivery passage 380 may be coupled to the exhaust passage 304 (e.g. 235) upstream of turbine 316 to provide high pressure EGR (HP-EGR) to the engine intake manifold, downstream of compressor 314. An EGR valve 352 may be coupled to the EGR passage 380 at the junction of the EGR passage 380 and the intake passage 342. EGR valve 352 may be opened to admit a controlled amount of exhaust to the compressor outlet for desirable combustion and emissions control performance. EGR valve 352 may be configured as a continuously variable valve or as an on/off valve. In further embodiments, the engine system may additionally or alternatively include a low pressure EGR (LP-EGR) flow path wherein exhaust gas is drawn from downstream of turbine 316 and recirculated to the engine intake manifold, upstream of compressor 314.

One or more sensors may be coupled to EGR passage 380 for providing details regarding the composition and condition of the EGR. For example, a temperature sensor 368 may be provided for determining a temperature of the EGR, a pressure sensor 369 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 328 (e.g. 233), an exhaust gas sensor 326 (e.g. 237), and an exhaust pressure sensor 329 may be coupled to the main exhaust passage 304. The exhaust gas sensor may be linear oxygen sensors or UEGO (universal or wide-range exhaust gas oxygen), two-state oxygen sensors or EGO, HEGO (heated EGO), a NOx, HC, or CO sensors. A catalyst monitor sensor (CMS) 398 (e.g. 298) may in some examples be coupled to the main exhaust passage 304, downstream of the emission control device (e.g. 370). CMS 398 may also be referred to as a post-catalyst oxygen sensor.

Similar to that discussed above at FIG. 2, exhaust gas sensor 326 may comprise a heated exhaust gas oxygen (HEGO) sensor. HEGO sensor 326 may further include a HEGO heating element 326a (e.g. 237a), under control of the controller, and which may serve to heat the HEGO sensor in order to raise temperature of the HEGO sensor to a desired operating temperature. HEGO sensor 326 may include a temperature sensing element (not shown), configured to indicate temperature of the HEGO sensor.

CMS 398 may comprise another heated exhaust gas oxygen sensor, and may further include a CMS heating element 398a (e.g. 298a). CMS heating element 298a may be under control of the controller, and may serve to heat the CMS 398 in order to raise temperature of the CMS to its desired operating temperature. CMS 398 may include a temperature sensing element (not shown), configured to indicated temperature of the CMS 398.

As will be discussed in detail below, there may be circumstances where one or more of HEGO heating element 326a and/or CMS heating element 398a may become degraded. In such a situation, it may be desirable to use alternative methodology to actively raise temperature of the HEGO sensor 326 and/or CMS 398. Such methodology will be discussed in detail below with regard to FIG. 6.

Engine system 308 may further include control system 214, as discussed above. Control system 214 is shown receiving information from a plurality of sensors 216 (various examples of which are described herein) and sending control signals to a plurality of actuators 281 (various examples of which are described herein). As one example, sensors 216 may include exhaust gas sensor 326 located upstream of the turbine 316, CMS 398, MAP sensor 324, exhaust temperature sensor 328, exhaust pressure sensor 329, compressor inlet temperature sensor 358, compressor inlet pressure sensor 356, ambient humidity sensor 357, IAT sensor 351, engine coolant temperature sensor, etc. Other sensors such as additional pressure, temperature, air/fuel ratio, and composition sensors may be coupled to various locations in engine system 308.

The actuators 281 may include, for example, electric booster bypass valve 361, throttle 320, electric booster actuator 355*b*, EGR valve 352, wastegate actuator 392, HEGO heating element 326*a*, CMS heating element 398*a*, and fuel injector 366. The control system 214 may include a controller 212. The controller 212 may receive input data from the various sensors, process the input data, and trigger various actuators in response to the processed input data based on instruction or code programmed therein corresponding to one or more routines.

Furthermore, similar to engine system 208, engine system 308 may be a hybrid vehicle with multiple sources of torque available to one or more vehicle wheels 130. For example, vehicle system 308 may include electric machine 341 (e.g. 241), also referred to as a motor or motor/generator. Crankshaft 374 (e.g. 274) may couple the engine 310 (e.g. 110) and the electric machine to wheels 130 via transmission 343 (e.g. 243) when one or more clutches 346 (e.g. 246) are engaged. Electric machine 341 (e.g. 241 or 120) may receive electrical power from traction battery 347 (e.g. 247 or 150), as discussed above. Crankshaft 374 may include a crankshaft sensor 349 (e.g. 249).

Still further, engine system 308 may be coupled to an evaporative emissions system (not shown at FIG. 3 but see 251 of FIG. 2) via a canister purge valve (CPV) 394 (e.g. 261). While the details of the evaporative emissions system and fuel system are not illustrated at FIG. 3, it may be understood that components of such systems are the same as that depicted above at FIG. 2.

Figure 4:
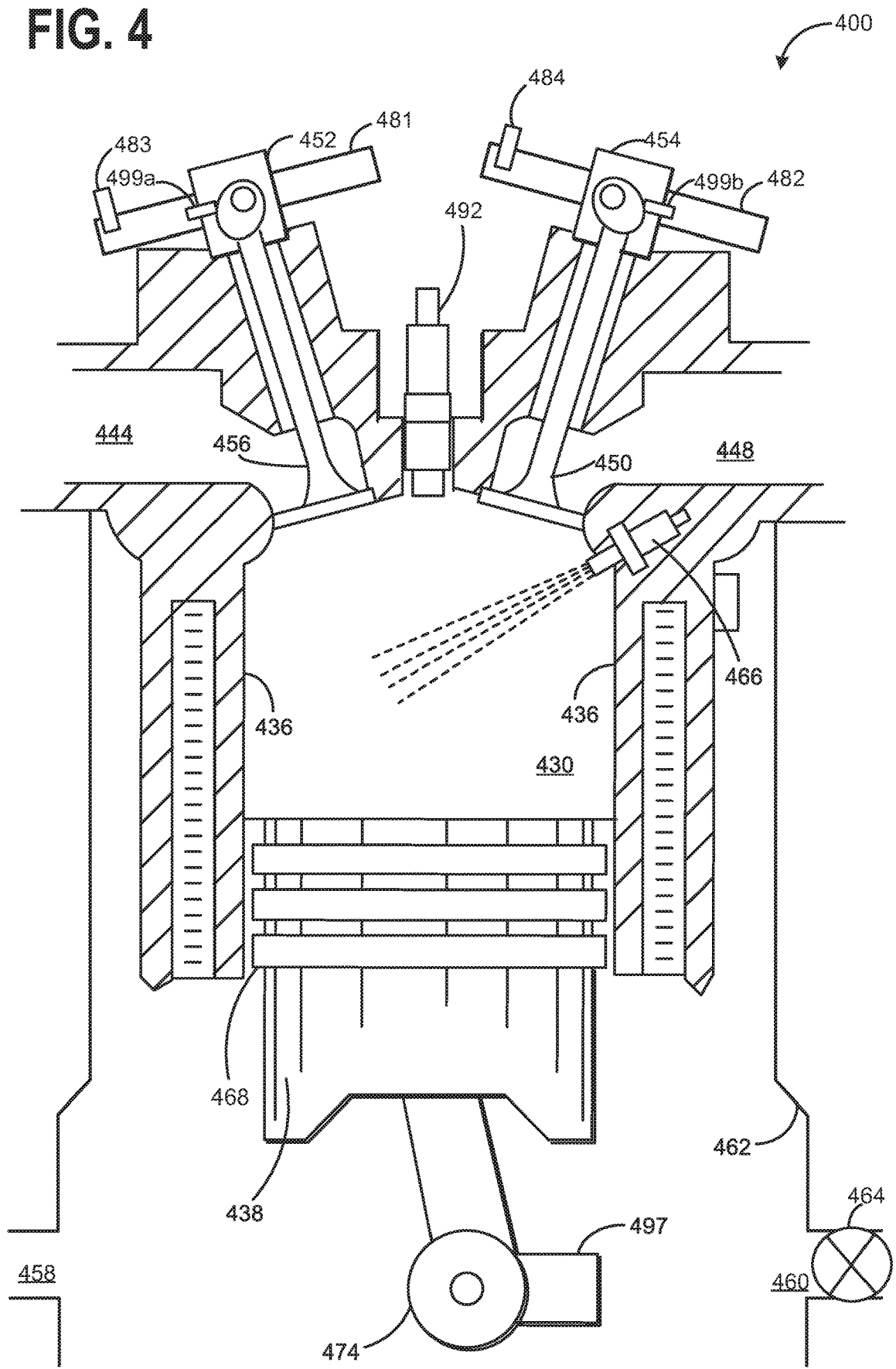
FIG. 4 schematically shows a single cylinder of the engine system(s) of FIGS. 1-3.

FIG. 4 depicts an example embodiment of a combustion chamber or cylinder that may be included in engine 110 depicted in FIG. 1. Cylinder (i.e. combustion chamber) 430 (e.g. 230, 330) may include combustion chamber walls 436 with piston 438 positioned therein. Piston 438 may include one or more piston rings 468. The one or more piston rings 468 may function to seal cylinder 430, to assist with piston heat transfer, and to regulate oil consumption, for example. Piston 438 may be coupled to crankshaft 474 (e.g. 274, 374) so that reciprocating motion of the piston is translated into rotational motion of the crankshaft. Crankshaft 474 may be coupled to at least one drive wheel of the passenger vehicle via a transmission system. Further, a starter motor or electric machine (e.g. 120) may be coupled to crankshaft 474 via a flywheel to enable a starting operation of engine 110, and/or to rotate the engine in an unfueled mode.

Cylinder 430 may receive intake air via intake air passage 444 (e.g. 242, 342), which may be one of a plurality of intake air passages coupled to cylinder 430. Intake air passage 444 may communicate with other cylinders of engine 110 in addition to cylinder 430. In some embodiments, one or more of the intake passages may include a boosting device such as a turbocharger or a supercharger. Exhaust passage 448 (e.g. 235, 304) may receive exhaust gases from cylinder 430 as well as from other cylinders of engine 110.

Each cylinder of engine 110 may include one or more intake valves and one or more exhaust valves. For example, cylinder 430 is shown including at least one intake poppet valve 456 (e.g. 253, 353) and at least one exhaust poppet valve 450 (e.g. 254, 354) located at an upper region of cylinder 430. In some embodiments, each cylinder of engine 110, including cylinder 430, may include at least two intake poppet valves and at least two exhaust poppet valves located at an upper region of the cylinder.

Intake valve 456 may be controlled by a controller via actuator 452. Similarly, exhaust valve 450 may be controlled by a controller via actuator 454. During some conditions, the controller may vary the signals provided to actuators 452 and 454 to control the opening and closing of the respective intake and exhaust valves. The position of intake valve 456 and exhaust valve 450 may be determined by respective position sensors 499*a* and 499*b*, respectively. The valve actuators may be of the electric valve actuation type or cam actuation type, or a combination thereof. The intake and exhaust valve timing may be controlled concurrently or any of a possibility of variable intake cam timing, variable exhaust cam timing, twin independent variable cam timing (TiVCT), or fixed cam timing may be used. Each cam actuation system may include one or more cams (e.g. actuator 452 and/or 454) and may utilize one or more of cam profile switching (CPS), variable cam timing (VCT), variable valve timing (VVT) and/or variable valve lift (VVL) systems that may be operated by a controller to vary valve operation. For example, cylinder 430 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Shown for illustrative purposes at FIG. 4 is an example of TiVCT. Specifically, an intake camshaft 481 and an exhaust camshaft 482 are illustrated. It may be understood that such a configuration may enable the ability to advance or retard timing of both the intake camshaft 481 and the exhaust camshaft 482 independently. Such an ability may allow for improved power and torque, particularly at lower engine speed (engine RPM), as well as improved fuel economy and reduced emissions. Such an ability may further enable precise control over intake and exhaust valve position, which may include in some examples positioning a particular cylinder with intake and exhaust valves both at least partially open.

In an example, a first oil pressure-controlled actuator 483 under control of the controller may regulate rotation of intake camshaft 481, and a second oil pressure-controlled actuator 484 may regulate rotation of second camshaft 482. In this way the first and second oil pressure-controlled actuators may control the camshafts to advance or retard engine timing based on operating conditions. For example, the controller may utilize crankshaft position sensor 497 (e.g. 249, 349) and position sensor(s) 499*a* and 499*b* to determine engine timing. While the example depicted herein at FIG. 4 illustrates the actuators (e.g. 483 and 484) of the camshafts as oil pressure-controlled, there may be some examples where instead of oil pressure driven cam phasing, cam torque actuation (CTA) may be employed, which may utilize existing torsional energy in the valve train to rotate the camshaft(s), as is commonly understood in the art.

Furthermore, it may be understood that in examples where the vehicle includes TiVCT, an EGR valve (e.g. 152) and EGR passage 380 may not be included in the vehicle system, as retarding exhaust cam timing may achieve a similar result as recirculating exhaust gases.

Still further, while FIG. 4 depicts an example of a TiVCT engine, as discussed above, in other examples the engine may comprise a variable displacement engine (VDE).

Cylinder 430 may have a compression ratio, which is the ratio of volumes within the cylinder between when piston 438 is at bottom dead center (BDC) and at top dead center (TDC). It may be understood that, as discussed herein, BDC may comprise a position of piston 438 being in closest proximity to crankshaft 474, whereas TDC may comprise a position of piston 438 being at a position farthest from crankshaft 474. Furthermore, it may be understood that, as discussed herein, TDC may be understood to be 180° from BDC. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 110 may include a spark plug (not shown) for initiating combustion. An ignition system (not shown) may provide an ignition spark to cylinder 430 via the spark plug (not shown) in response to a spark advance signal from a controller, under select operating modes. However, in some embodiments, the spark plug may be omitted, such as where engine 110 may initiate combustion by auto-ignition or by injection of fuel as may be the case with some diesel engines. In still other embodiments, a laser ignition device 492, also referred to herein as simply, laser 492, may be included in engine 110 and may be configured to ignite mixtures of fuel and oxidizer, similar to that provided via a spark plug.

In some embodiments, each cylinder of engine 110 may be configured with one or more fuel injectors for providing fuel thereto. As a non-limiting example, cylinder 430 may include two fuel injectors (e.g., a port fuel injector and a direct fuel injector). Fuel injector 466 (e.g. 266, 366) is shown coupled directly to cylinder 430 for injecting fuel directly therein in proportion to a pulse width of a signal received from a controller via an electronic driver. In this manner, fuel injector 466 provides what is known as direct injection (hereafter referred to as "DI") of fuel into cylinder 430. While FIG. 4 shows injector 466 as a side injector, it may also be located overhead of the piston, such as near the position of spark plug (not shown) or laser ignition device 492. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 466 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

Fuel may be delivered to the cylinder during a single cycle of the cylinder. Discussed herein, a single engine cycle includes an exhaust stroke, an intake stroke, a compression stroke, and a power stroke. It may be further understood that, when a piston is within a threshold (e.g. within 5°) of TDC between the exhaust stroke and the intake stroke, both the intake valve and the exhaust valve may be at least partially open. Directly injected fuel may be delivered during an intake stroke as well as partly during a previous exhaust stroke. Further, the direct injected fuel may be delivered as a single injection or as multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

A positive crackcase ventilation (PCV) system, may be coupled to the engine intake so that gasses in the crankcase 462 may be vented in a controlled manner from the crankcase. Engine 110 may include a crankcase ventilation tube 458, and a PCV line 460 in order to vent gasses out of the crankcase 462 and into intake manifold. In some examples PCV line 460 may include PCV valve 464, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 4 shows only one cylinder of a multi-cylinder engine. As such each cylinder may similarly include its own set of intake/exhaust valves, fuel injector(s), spark plugs, laser ignition devices, piston rings, etc.

Figure 5A:
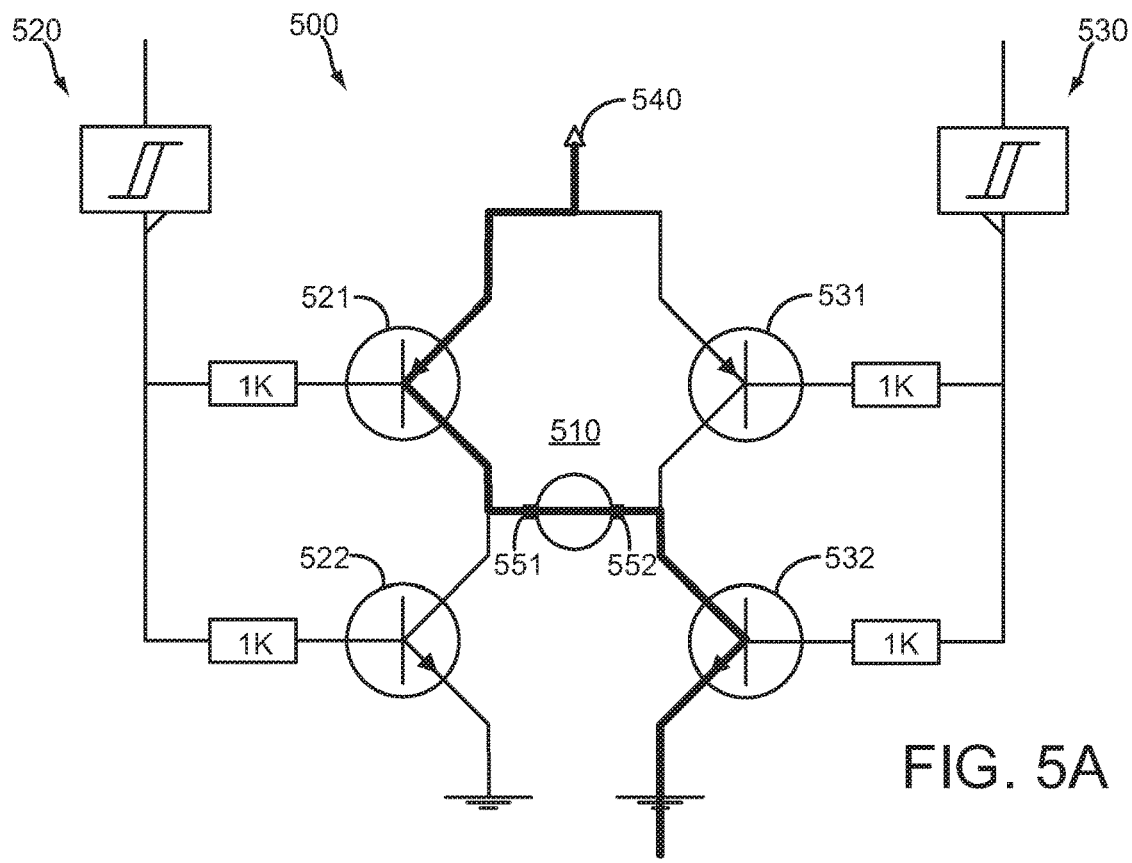
FIGS. 5A-5B depict example H-bridge circuitry which may be used to rotate a vehicle engine, or an electric compressor, in a forward or reverse direction.
Figure 5B:
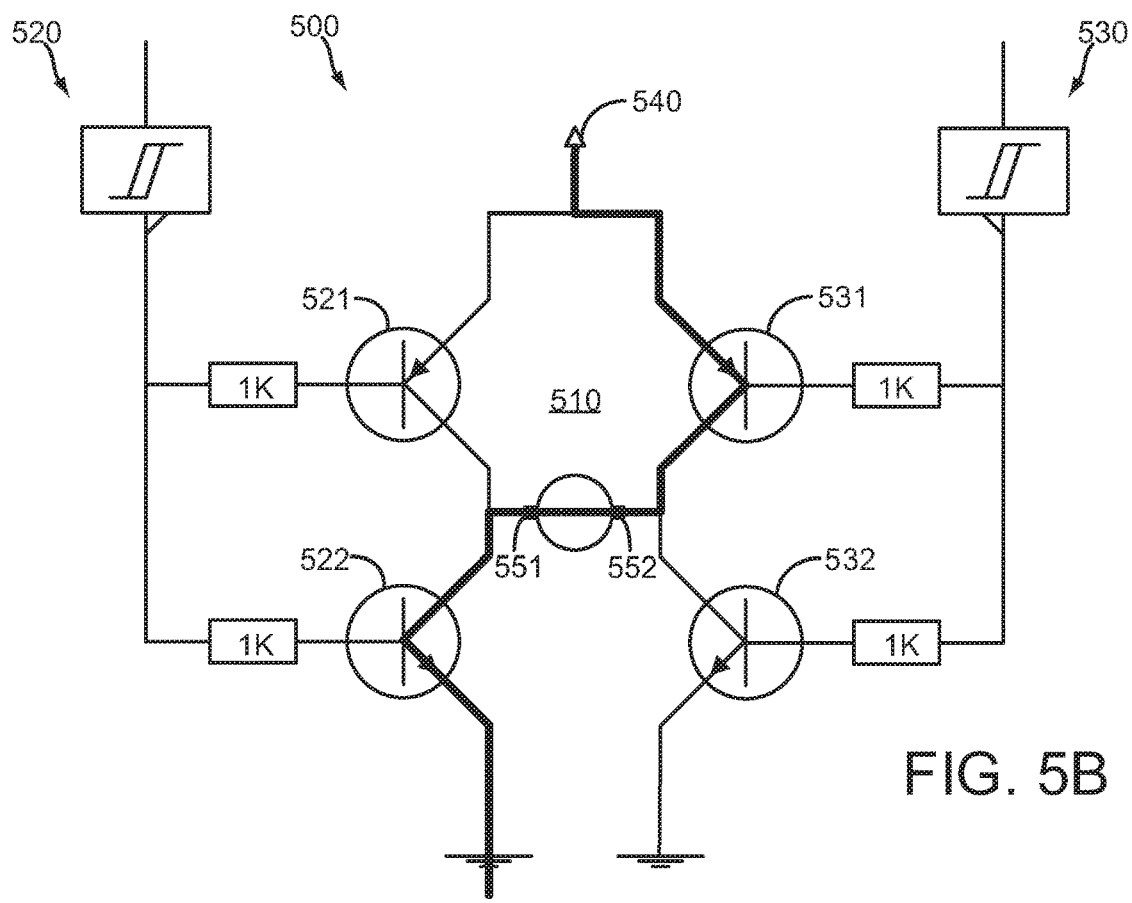

FIGS. 5A and 5B show an example circuit 500 that may be used for reversing a spin orientation of an electric motor (e.g. 120). Such a circuit may be used to spin the engine (e.g. 110) in a forward (e.g. the same direction as when the engine is operating to combust air and fuel) or reverse direction, and/or may be used to spin an electric compressor (e.g. 355) in a forward (e.g. where compressed air is routed to the engine and exhaust system) or reverse direction. Accordingly, circuit 500 schematically depicts an H-Bridge circuit that may be used to run a motor 510 (e.g. 120 and/or 241, 341)) in a first (forward) direction and alternately in a second (reverse) direction. Circuit 500 comprises a first (LO) side 520 and a second (HI) side 530. Side 520 includes transistors 521 and 522, while side 530 includes transistors 531 and 532. Circuit 500 further includes a power source 540.

In FIG. 5A, transistors 521 and 532 are activated (energized), while transistors 522 and 531 are off. In this configuration, the left lead 551 of motor 510 is connected to power source 540, and the right lead 552 of motor 510 is connected to ground. In this way, motor 510 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle.

It may be understood that in some examples, the engine may be spun in the forward (e.g. default) direction unfueled and without combustion, whereas in other examples, the engine may be spun in the reverse direction unfueled and without combustion. Similarly, in some examples the electric compressor may be spun or rotated in a forward direction, whereas in other examples, the engine may be spun in the reverse direction.

In FIG. 5B, transistors 522 and 531 are activated (energized), while transistors 521 and 532 are off. In this configuration, the right lead 552 of motor 510 is connected to power source 540, and the left lead 551 of motor 510 is connected to ground. In this way, motor 510 may run in a reverse direction.

The systems described above and with regard to FIGS. 1-5B, may enable a system for a hybrid vehicle, comprising a controller with computer readable instructions stored in non-transitory memory. Such instructions, when executed may cause the controller to activate an electric heat source and actively route heat from the electric heat source to a heated exhaust gas oxygen sensor under conditions of a start event of an engine where a heating element for the heated exhaust gas oxygen sensor is degraded. Such action may serve to increase temperature of the heated exhaust gas oxygen sensor to its desired operating temperature, where actively routing heat from the heat source to the heated exhaust gas oxygen sensor includes rotating the engine via a motor in a forward or reverse direction unfueled, as a function of position of the heated exhaust gas oxygen sensor with the degraded heating element, and the electric heat source.

In one example of such a system, the electric heat source further comprises a heater coupled to an emissions control device positioned in an exhaust system of the engine, or one or more laser ignition devices configured to provide laser ignition energy to one or more cylinders of the engine.

Such a system may further comprise an intake air throttle positioned in an intake of the engine, and an exhaust tuning valve positioned in an exhaust system of the engine. In such an example, the controller may store further instructions to control position of one or more of the throttle and/or exhaust tuning valve such that heat from the electric heat source is sequestered in a vicinity of the heated exhaust gas oxygen sensor while undesirable pressure build-up in the engine is avoided. The vicinity of the heated exhaust gas oxygen sensor may comprise an area or space near (e.g. within a threshold distance of) the heated exhaust gas oxygen sensor, where heat from the electric heat source may readily raise temperature of the heated exhaust gas oxygen sensor in a threshold amount of time. The threshold amount of time may be related to the particular engine start event. For example, the threshold amount of time may comprise a desired amount of time for the sensor to reach its desired operating temperature, so that the engine fueling control may enter closed-loop control.

In some examples of such a system, the system may further comprise an electric booster positioned in an intake of the engine. In such an example, the controller may store further instructions to select to utilize the electric booster rotated via the motor in either the forward or reverse direction rather than the engine, to actively route heat from the heat source to the heated exhaust gas oxygen sensor. Turning now to FIG. 6, a high-level flowchart for an example method 600 for actively raising a temperature of an HEGO, as a function of current vehicle operating conditions, is shown. More specifically, method 600 may be used to actively raise a temperature of a HEGO (e.g. 237, 326) positioned upstream of an emissions control device (e.g. 270, 370), or the HEGO may comprise a CMS (or post-catalyst oxygen sensor) (e.g. 298, 398) positioned downstream of the emissions control device. Actively raising the temperature of the HEGO or CMS may be in response to an indication that a HEGO heating element (e.g. 237*a*, 326*a*), or CMS heating element (e.g. 298*a*, 398*a*), are degraded or otherwise not functioning as desired. Method 600 will be described with reference to the systems described herein and shown in FIGS. 1-5B, though it will be appreciated that similar methods may be applied to other systems without departing from the scope of this disclosure. Instructions for carrying out method 600 and the rest of the methods included herein may be executed by a controller, such as controller 212 of FIGS. 2-3, based on instructions stored in non-transitory memory, and in conjunction with signals received from sensors of the engine system, such as temperature sensors, pressure sensors, and other sensors described in FIGS. 1-4. The controller may employ actuators such as motor/generator (e.g. 120), throttle (e.g. 262, 320), VDE actuator(s) (e.g. 276, 277, 376, 377), electric booster (e.g. 355), EGR valve (e.g. 352), wastegate actuator (e.g. 392), laser ignition device (e.g. 492), etc., according to the methods described herein.

Method 600 begins at 605, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether conditions are met for actively heating a heated exhaust gas oxygen sensor, where the heated exhaust gas oxygen sensor may comprise a HEGO positioned upstream of the emissions control device, or a CMS positioned downstream of the emissions control device. As one example, conditions being met at 610 may comprise an indication that a HEGO heating element (e.g. 237*a*, 326*a*) configured to heat the HEGO positioned upstream of the emissions control device, is degraded or otherwise not functioning as desired or expected. In another example, conditions being met at 610 may comprise an indication that a CMS heating element (e.g. 298*a*, 398*a*) configured to heat the CMS positioned downstream of the emissions control device, is degrade or otherwise not functioning as desired or expected. Conditions being met at 610 may in some examples additionally include an indication of a cold-start event (e.g. a request to start the engine after a long vehicle soak, such as greater than six hours), where the HEGO heating element or CMS heating element is not functioning as desired. In another example, conditions being met at 610 may include an indication that the vehicle is in the process of a S/S event, where a temperature of either the HEGO sensor positioned upstream of the emissions control device or CMS positioned downstream of the emissions control device drops to below a threshold temperature while the engine is not combusting air and fuel. Conditions being met at 610 may further include an indication that a laser ignition device (e.g. 492) is functioning as desired. Conditions being met at 610 may in some examples include an indication that VDE actuators are functioning as desired. Conditions being met at 610 may in some examples include an indication that an EGR valve, wastegate, throttle, electric booster bypass valve, etc., are functioning as desired. Conditions being met at 610 may in some examples include an indication that an electric heater (e.g. 256*a*, 327*a*) configured to heat the emissions control device, is functioning as desired. Conditions being met at 610 may in some examples include an indication that the electric booster is functioning as desired. Conditions being met at 610 may in some examples include an indication that an electric motor configured to rotate the engine and/or electric booster, is functioning as desired.

If, at 610, conditions are not indicated to be met for actively heating the HEGO sensor positioned upstream of the emissions control device, or for actively heating the CMS positioned downstream of the emissions control device, method 600 may proceed to 615. At 615, method 600 may include maintaining current vehicle operating parameters. For example, current operational status of the engine, electric motor, various valves, electric booster, etc., may be maintained. Method 600 may then end.

Returning to 610, in response to conditions being indicated to be met for actively heating the HEGO sensor positioned upstream of the emissions control device, or CMS positioned downstream of the emissions control device, method 600 may proceed to 620. At 620, method 600 may include selecting a method for actively heating either the HEGO sensor positioned upstream of the emissions control device, or the CMS positioned downstream of the emissions control device. Such a selection may be made via the controller, and the selection may be based on a number of relevant current vehicle operating parameters.

As a first example, in response to an indication of a S/S event where a temperature of the HEGO sensor positioned upstream of the emissions control device drops below the threshold temperature, or desired operating temperature, while the engine is not combusting and where the heating element configured to heat the HEGO sensor is indicated to be degraded, the following method may be selected. Specifically, the heater (e.g. 256, 327) configured to heat the emissions control device may be activated, and the engine may be rotated unfueled in reverse via the motor (e.g. 120) to direct heat from the emissions control device to the HEGO sensor positioned upstream of the emissions control device. In such an example, the throttle (e.g. 262) may be commanded to an at least partially open position, to relieve pressure in the engine intake due to rotating the engine unfueled in reverse. However, the throttle may not be commanded fully open, so that heat may be sequestered in the vicinity of the HEGO sensor. Such a method may be used, for example, if the vehicle engine system is not equipped with an electric booster, for example, or if a battery charge state is greater than a predetermined battery charge state where rotating the engine unfueled may not adversely impact downstream applications that may rely on battery power. The methodology discussed above related to the first example may be conducted in a situation where the emissions control device is above its desired operating temperature at the time when the HEGO sensor drops below its desired operating temperature, or may be used in similar fashion in an example where the emissions control device has also dropped below its desired operating temperature.

Accordingly, as a second example, in response to an indication of a S/S event where a temperature of the HEGO sensor positioned upstream of the emissions control device drops below the threshold temperature, or desired operating temperature, while the engine is not combusting and where the heating element configured to heat the HEGO sensor is indicated to be degraded, the following method may be selected. Specifically, the heater (e.g. 256, 327) configured to heat the emissions control device may be activated, and rather than rotating the engine unfueled in reverse, the electric booster (e.g. 355) may be rotated in reverse, to direct heat from the emissions control device to the HEGO sensor positioned upstream of the emissions control device. In such an example, the EGR valve (e.g. 352) and wastegate (e.g. 391) may each be commanded fully open, and the throttle may be commanded at least partially open, or in another example, may be commanded fully open. In such an example, an electric booster bypass valve may be commanded or maintained closed. Furthermore, in such an example, if the engine comprises a VDE engine, the engine cylinders may be commanded sealed, such that fluid flow is directed around the restrictive engine. Such action may reduce an amount of battery utilized in drawing heated air from the emissions control device to the HEGO sensor positioned upstream of the emissions control device. Such a method may be used, for example, in vehicles where the engine includes an electric booster, and/or may be used in response to the battery charge state being less than the predetermined battery charge state discussed above in the first example. In other words, such a method may utilize less battery power than the method of rotating the large mass of the engine in reverse unfueled, and thus may be desirable to utilize under conditions where battery power is limited.

As a variation on the second example where the electric booster is utilized, rather than sealing the engine and routing fluid flow around the engine, in another example the engine may be positioned such that one or more engine cylinders are configured with both intake and exhaust valves both at least partially open. In such an example, the wastegate may also be commanded fully open, but the EGR valve may be commanded or maintained closed (the throttle may still be commanded at least partially or fully opened, and the electric booster bypass valve may be commanded or maintained closed). Such an example may include an example where the engine comprises a TiVCT engine, as discussed with regard to FIG. 4. For example, the engine may be briefly spun unfueled until the engine is positioned such that at least one cylinder has both intake and exhaust valve(s) open. In this way, a path for fluid flow through the engine may be created. It may be understood that in some examples, the engine may not comprise a TiVCT engine, and by rotating the engine unfueled, intake and exhaust valves may be controlled to be at least partially open. The methodologies discussed above related to the second examples may be conducted in a situation where the emissions control device is above its desired operating temperature at the time when the HEGO sensor drops below its desired operating temperature, or may be used in similar fashion in an example where the emissions control device has also dropped below its desired operating temperature.

As a third example, in response to an indication of an S/S event where a temperature of the HEGO sensor positioned upstream of the emissions control device drops below the threshold temperature, or desired operating temperature, while the engine is not combusting and where the heating element configured to heat the HEGO sensor is indicated to be degraded, the following method may be selected. Specifically, in a case where the engine includes laser ignition devices (e.g. 492) for initiating combustion in engine cylinders, one or more laser ignition devices may be activated without fueling provided to the cylinder(s) for which the laser(s) are activated. The cylinder(s) for which the laser(s)

are activated may be selected based on said cylinder(s) having both their intake and exhaust valve(s) closed, while in other examples the desired cylinders for which lasers are activated may be actively sealed in the case of a VDE engine, or the engine may first be rotated (in some examples in conjunction with TiVCT control) to a position where one or more cylinders are sealed. By sealing cylinders for which laser energy is provided via the laser ignition device(s), the heat generated as a function of the laser activation may be stored in the engine cylinders. More specifically, the laser energy may be focused on the piston for selected cylinders, which may generate heat due to the laser beam striking the metallic piston.

In this third example, the laser(s) may be activated for a predetermined period of time with the corresponding cylinders sealed, and then the engine cylinders with the trapped heat may be unsealed. In one example, unsealing the cylinders with trapped heat may include rotating the engine unfueled in a forward or default direction via the motor (e.g. 120), to direct the trapped heat to the HEGO sensor positioned upstream of the emissions control device, in order to raise the HEGO sensor temperature to its desired operating temperature. In such an example, the laser(s) may either be commanded off, or may be kept on, or kept activated. Furthermore, in such an example, the throttle may be commanded at least partially open, and in a case where the engine includes an electric booster bypass valve, the electric booster bypass valve may be commanded or maintained open. Still further, the wastegate may be commanded open (e.g. fully open), and the EGR valve may be commanded closed (e.g. fully closed).

In another example variation on the third example, rather than rotating the engine unfueled in the forward direction, the engine cylinders with trapped heat may be unsealed so that cylinders with trapped heat may be configured with intake and exhaust valves both positioned to be at least partially open, and the electric booster may be activated to rotate in the forward direction, which may direct compressed air to the engine, which may thus force heated air to the HEGO sensor positioned upstream of the emissions control device. The third example may be selected, for example, based on the engine system having laser ignition devices, and may in one example be selected if the emissions control device has not dropped below its desired operating temperature during the S/S event while the engine is not combusting air and fuel. More specifically, the heat generated via the activation of the laser ignition device(s) may serve to heat the HEGO sensor, and may additionally serve to maintain the temperature of the emissions control device at a temperature at or above its desired operating temperature.

Alternatively, in another example, the third methodology may be utilized under conditions where temperature of the emissions control device dropped below its desired operating temperature during the S/S event. In such an example, the laser-generated heat may serve to raise temperature of the emissions control device to a temperature at or above its desired operating temperature. In yet another example where the emissions control device drops below its desired operating temperature, the strategy of using laser ignition devices to heat the HEGO sensor positioned upstream of the emissions control device may be used, and additionally, the electric heater associated with the emissions control device may additionally be activated to raise the temperature of the emissions control device to at or above its desired operating temperature. It may be understood that for the third example where the electric booster is activated in the forward direction to route trapped heat from the engine cylinders to the HEGO positioned upstream of the emissions control device, the EGR valve may be commanded/maintained closed, the electric booster bypass valve may be commanded/maintained closed, the electric booster bypass valve may be commanded/maintained closed, and the throttle may be commanded to an at least partially open (or in some examples fully open) configuration.

In any of the above descriptions of the third examples, where trapped in-cylinder heat is directed from the engine toward the exhaust system, for vehicles equipped with an exhaust tuning valve (e.g. 299, 399) under control of the vehicle controller, such an exhaust tuning valve may be commanded to a position that is at least partially closed, such that the heat for raising temperature of the HEGO sensor may be sequestered in the vicinity of the HEGO sensor. In one example, the exhaust tuning valve may be commanded completely or fully closed for a predetermined or determined period of time, said period of time a function of pressure build-up in the exhaust system due to the routing of heat from the cylinders to the exhaust system. For example, the exhaust tuning valve may only be maintained closed if pressure in the exhaust system is maintained below a predetermined pressure, which may be inferred as a function of time which the in-cylinder heat is routed to the exhaust system or which may be measured.

In some examples, the third example may be conducted at a cold-start event, where the heating element configured to heat the HEGO sensor is indicated to be degraded, and where the heating element and sensor are positioned either upstream, or downstream, of the emissions control device. More specifically, at a cold-start event, one or more cylinders of the engine may be sealed, then one or more laser ignition devices may be activated, to generate in-cylinder heat. The heated gas in the cylinder(s) may then be transferred to the HEGO sensor positioned either upstream or downstream of the emissions control device, via either unsealing engine cylinder(s) and rotating the engine in the forward direction, or via unsealing the cylinder(s) for which in-cylinder heat was generated, and then transferring the heated gas from said cylinder(s) to the HEGO sensor positioned either upstream or downstream of the emissions control device via rotating the electric booster position in engine intake, in the forward direction. In such a case where the electric booster is utilized, to effectively transfer in-cylinder heat to the sensor, such a method may include positioning both intake valve(s) and exhaust valve(s) coupled to whatever cylinders received laser ignition energy, in at least partially open configurations. In one example, the at least partially open configurations may include positions where the electric booster may effectively transfer fluid flow through the engine cylinder(s) that received laser ignition energy, to route the heated gas to the sensor. Furthermore, in either a case where the sensor is positioned upstream or downstream of the emissions control device, at a cold-start event, a heater configured to raise temperature of the emissions control device, may additionally be activated in some examples.

As a fourth example, in response to an indication of a cold-start event where a temperature of the HEGO sensor positioned upstream of the emissions control device is below the threshold temperature, or desired operating temperature, and where the heating element configured to heat the HEGO sensor is indicated to be degraded, the following methodology may be selected. Specifically, as at a cold-start temperature of the emissions control device may need to be raised quickly to its desired operating temperature (e.g. light-off temperature), the electric heater (e.g. 256, 327)

coupled to the emissions control device may be activated. To raise temperature of the HEGO sensor positioned upstream of the emissions control device to its desired operating temperature, the engine may be rotated unfueled in reverse via the motor, to draw at least a portion of the heat from the emissions control device to the HEGO sensor. In such an example, speed of the rotation of the engine in reverse and amount of heat provided to the emissions control device may be controlled so as to raise temperature of the HEGO sensor to its desired operating temperature while also raising temperature of the emissions control device to its desired operating temperature. In such an example, the throttle may be commanded at least partially open, and the wastegate (where included) may be commanded fully open. The EGR valve (where included) may be maintained closed, and the electric booster bypass valve (where included) may be commanded fully open. Such an example may include a situation where the vehicle does not include an electric booster, and may include a situation where laser ignition devices are not provided for initiating combustion in engine cylinders. Such an example may additionally or alternatively include an indication that the battery state of charge is greater than the predetermined battery charge state where rotating the engine unfueled in reverse may not adversely impact downstream applications that may rely on battery power.

In a variation of the fourth example, rather than rotate the engine in reverse unfueled, in a case where the engine system includes the electric booster, the electric booster may be activated in reverse to draw heat from the emissions control device (heated via the electric heater coupled to the emissions control device) to the HEGO sensor positioned upstream of the emissions control device. More specifically, in such an example, the throttle may be commanded at least partially or fully open, the electric booster bypass valve may be commanded or maintained closed, and engine cylinders may be commanded sealed (e.g. for a variable displacement engine) while the EGR valve and wastegate are commanded fully open. Alternatively, rather than sealing the engine cylinders, the engine may be controlled to position at least one engine cylinder with its intake and exhaust valves at least partially open, to create a path through the engine for fluid flow. In such an example, the EGR valve may be commanded or maintained closed, but the wastegate may be commanded fully open. The electric booster bypass valve may be commanded or maintained closed, and the throttle may be commanded at least partially, or in some examples, fully, opened.

In yet another variation of the fourth example, the electric heater coupled to the emissions control device may be utilized to raise temperature of the emissions control device, but rather than rotating the engine in reverse or operating the electric booster in reverse to draw heat from the emissions control device to the HEGO sensor positioned upstream of the emissions control device, the laser ignition device(s) may be used to generate in-cylinder heat as discussed above, and such heat may then be routed to the HEGO sensor to raise its temperature to its desired operating temperature. Similar to that described above, one or more cylinders may be controlled to be sealed, whereupon the laser ignition device(s) coupled to the one or more cylinders may be activated, resulting in the generation of heat in the selected one or more cylinders. After a predetermined time of heat generation in such fashion, the engine may be either rotated unfueled in the forward direction to direct the trapped in-cylinder heat to the HEGO sensor positioned upstream of the emissions control device, or the particular cylinder(s) may be commanded unsealed (e.g. for a variable displacement engine) or otherwise controlled (e.g. via unfueled engine rotation) such that intake and exhaust valve(s) for the selected cylinders are both at least partially open, and the electric booster may be activated in the forward direction to direct the trapped in-cylinder heat to the HEGO sensor positioned upstream of the emissions control device. In such an example where the laser ignition device(s) are utilized, it may be understood that the EGR valve may be commanded or maintained closed (where included), the wastegate (where included) may be commanded or maintained open, the electric bypass valve may be commanded or maintained closed, and the throttle may be commanded at least partially open, or in some examples fully open. Furthermore, it may also be understood that heat from the laser ignition device(s), while serving to raise temperature of the HEGO sensor positioned upstream of the emissions control device, may additionally add heat to the emissions control device. Thus, such action may be beneficial as less overall heat may be needed to be provided via the electric heater coupled to the emissions control device, as some heat for raising the temperature of the emissions control device may be provided via the trapped in-cylinder heat. In some examples, the different variations on the fourth example may be selected as a function of current state of charge of the energy storage device. For example, the controller may select which variation of the fourth example to utilize, depending on whether the state of charge is above a predetermined threshold, or below a predetermined threshold.

As discussed above with regard to FIGS. 2-3, in some examples there may be a CMS (e.g. 298, 398), or post-catalyst oxygen sensor, positioned downstream of the emissions control device. Such a CMS may have heating elements (e.g. 256*a*, 398*a*), and such heating elements may in some situations become degraded, similar to the heating elements coupled to the HEGO sensors positioned upstream of the emissions control device. Accordingly, in a fifth example, in response to an indication of a S/S event where a temperature of the CMS drops below its threshold temperature, or desired operating temperature, and where the heating element coupled to the CMS is indicated to be degraded, or in response to a cold-start event where the heating element coupled to the CMS is indicated to be degraded, the following method may be selected. Specifically, the heater configured to heat the emissions control device may be activated, and the engine may be rotated unfueled in a forward or default direction, to direct at least a portion of the heat from the emissions control device to the CMS sensor to raise its temperature to its desired operating temperature. In such an example, the throttle may be commanded at least partially open, and the electric booster bypass valve (where included) may be commanded at least partially open. Furthermore, the EGR valve (where included) may be commanded or maintained closed, and the wastegate (where included) may be commanded fully open. For vehicles equipped with an exhaust tuning valve (e.g. 299, 399), the position of the exhaust tuning valve may be controlled to effectively sequester heat in the vicinity of the CMS, while also avoiding resultant undesirable pressure build-up in the exhaust system, as discussed above.

In a variation of the fifth example, rather than rotating the engine unfueled in the forward direction, the electric booster may be commanded on in the forward direction. In such an example, the engine cylinders may be sealed, the EGR valve may be commanded fully open, and the wastegate may be commanded fully open. The exhaust tuning valve may be controlled to sequester heat near the vicinity of the CMS, as discussed. Further, the throttle may be commanded at least partially open, and the electric booster bypass valve may be commanded or maintained closed.

In yet other variations of the fifth example, the laser ignition device(s) may additionally or alternatively be utilized to generate the heat for raising temperature of the CMS to its desired operating temperature. A similar approach may be used as that described above at the third example, where the laser ignition device(s) may be activated with cylinders sealed, in order to generate trapped in-cylinder heat. Subsequently, the engine may be rotated in the forward direction to route the heat to the CMS sensor, or the electric booster may be utilized to route the heat to the CMS sensor, as discussed above. Use of the laser ignition device(s) may in some examples be in addition to heating of the emissions control device via the heater coupled to the emissions control device. For example, heat routed from the emissions control device to the CMS sensor may be replaced via heat from the laser ignition devices, such that both the CMS and the emissions control device each reach their respective desired operating temperatures as quickly as possible.

Thus, the examples described above, represent methods that may be selected via the controller depending on current vehicle operating conditions and which sensor (e.g. HEGO sensor upstream of the emissions control device, or CMS positioned downstream of the emissions control device) is not capable of being heated by its own internal heating element. Once selected, method 600 may proceed to 625. At 625, method 600 may include actively raising the temperature of the particular sensor (e.g. HEGO sensor upstream of the emissions control device, or CMS positioned downstream of the emissions control device), to its desired operating temperature, as discussed in detail above with regard to the first through fifth examples. Thus, proceeding to 630, once said selected methodology is initiated, method 600 may include indicating whether the temperature of the particular sensor has reached its predetermined threshold temperature, or desired operating temperature. If not, method 600 may return to step 625 of method 600, where temperature of the particular sensor may be monitored and where the selected methodology may be continued, to raise temperature of the particular sensor with the degraded heating element, to its desired operating temperature.

At 630, responsive to the particular sensor being indicated to have reached its desired operating temperature, or predetermined threshold temperature, method 600 may proceed to 635. At 635, method 600 may include discontinuing actively raising the temperature of the particular sensor for which active heating was requested/selected. More specifically, depending on what methodology was selected, the engine, the electric booster, various valves such as the electric booster bypass valve, wastegate, EGR valve, throttle, exhaust tuning valve, etc., and laser ignition device(s), may all be returned to their respective states prior to conducting the methodology to actively raise the temperature of the particular sensor selected for heating.

Proceeding to 640, method 600 may include updating vehicle operating parameters. For example, updating vehicle operating parameters may include updating the current temperature of both the exhaust gas oxygen sensors (e.g. HEGO sensor positioned upstream of the emissions control device and/or CMS positioned downstream of the emissions control device), and emissions control device. Updating vehicle operating parameters may further include updating a charge state of the onboard energy storage device, to reflect the current charge state due to the active heating operation conducted. Method 600 may thus end. While method 600 is depicted as engine after step 640, it may be understood that temperature of the HEGO sensor positioned upstream of the emissions control device and the CMS positioned downstream of the emissions control device may be continued to be monitored during the S/S event, or cold start event, such that if temperature of a sensor that also includes a degraded heating element again drops below its desired operating temperature, method 600 may again be conducted, until the engine is started.

Thus, the method of FIG. 6 may enable a method comprising reducing undesired emissions at a start event of an engine that propels a vehicle under conditions where a temperature of a heated exhaust gas oxygen sensor is below its desired operating temperature and where a heating element configured to heat the sensor is degraded, by providing an alternative heat source and actively routing heat from said source to the sensor to raise the temperature of the sensor to its desired operating temperature.

As one example, the start event of the engine may comprise a cold-start event. As another example, the start event of the engine may comprise a start/stop event where the temperature of the sensor has decreased to below its desired operating temperature while the engine is not combusting air and fuel.

In such a method, reducing undesired emissions may include reducing undesired emissions at the start event as compared to conditions where the heated exhaust gas oxygen sensor remains below its desired operating temperature for the start event.

In such a method, actively routing heat from said source to the sensor includes one of rotating the engine unfueled in a forward or reverse direction, or rotating an electric booster positioned in an intake of the engine in the forward or reverse direction. In such an example, the forward or reverse direction for both rotating the engine and for rotating the electric booster may be selected based on a position of the sensor with respect to an emissions control device positioned in an exhaust system of the engine of the vehicle, and the alternative heat source. In other words, selecting whether to rotate either the engine or the electric booster in the forward direction or the reverse direction, may be determined via the controller based on the position of the sensor, and what heat source is provided. More specifically, the engine may be rotated unfueled in reverse, or the electric booster may be rotated in reverse, under conditions where the sensor is positioned upstream of the emissions control device and where the alternative heat source comprises a heater configured to heat the emissions control device. In another example, the engine may be rotated unfueled in the forward direction or the electric booster may be rotated in the forward direction under conditions where the sensor is positioned upstream of the emissions control device and where the alternative heat source comprises one or more laser ignition devices configured to provide laser ignition energy to one or more cylinders of the engine. In yet another example, the engine may be rotated unfueled in the forward direction or the electric booster may be rotated in the forward direction under conditions where the sensor is positioned downstream of the emissions control device and where either or both of the heater configured to heat the emissions control device and/or the one or more laser ignition devices comprise the alternative heat source.

In one example of such a method, actively routing heat from said source to the sensor may include selecting whether to rotate the engine in the forward or reverse direction as compared to whether to use the electric booster in the forward or reverse direction. Such selecting may be based on at least a charge state of an onboard energy storage device that powers a motor configured to rotate the engine and electric booster in the forward or reverse directions.

Such a method may further comprise controlling a position of an air intake throttle and/or an exhaust tuning valve, for actively routing heat from said source to the sensor to raise the temperature of the sensor to its desired operating temperature.

Another example of a method comprises, at a start-event of an engine, responsive to detection of a degraded heating element of an oxygen sensor, operating a laser ignition source of the engine without combustion and spinning an electrically-driven intake air compressor to transport heated cylinder gas to the sensor.

In such a method, the heating element may be configured to raise temperature of the sensor, and the heating element and the sensor may both be positioned either upstream or downstream of an emissions control device positioned in an exhaust system of the engine.

In such a method, the method may further comprise sealing a cylinder or cylinders of the engine while operating the laser ignition source (or more than one laser ignition source), where the cylinder or cylinders receive laser ignition energy from the laser ignition source. Such a method may further comprise unsealing the cylinder or cylinders to transport heated cylinder gas to the sensor via spinning the electrically-driven intake air compressor. For example, unsealing the cylinder or cylinders to transport heated cylinder gas to the sensor via spinning the electrically-driven compressor may further comprise positioning the cylinder or cylinders with both intake and exhaust valve(s) coupled to the cylinder or cylinders at least partially open.

In such a method, the method may further include either stopping operating the laser ignition source upon sealing the cylinder, or maintaining operating the laser ignition source upon unsealing the cylinder for transporting cylinder gas to the sensor.

In such a method, the method may further comprise commanding open a wastegate positioned in a wastegate passage configured to route fluid flow around a turbine to transport heated cylinder gas to the sensor.

In such a method, the method may further comprise commanding closed an exhaust gas recirculation valve positioned in an exhaust gas recirculation passage of the engine, to transport heated cylinder gas to the sensor.

In such a method, the method may further comprise controlling a position of an air intake throttle and/or an exhaust tuning valve to transport heated cylinder gas to the sensor.

Figure 7:
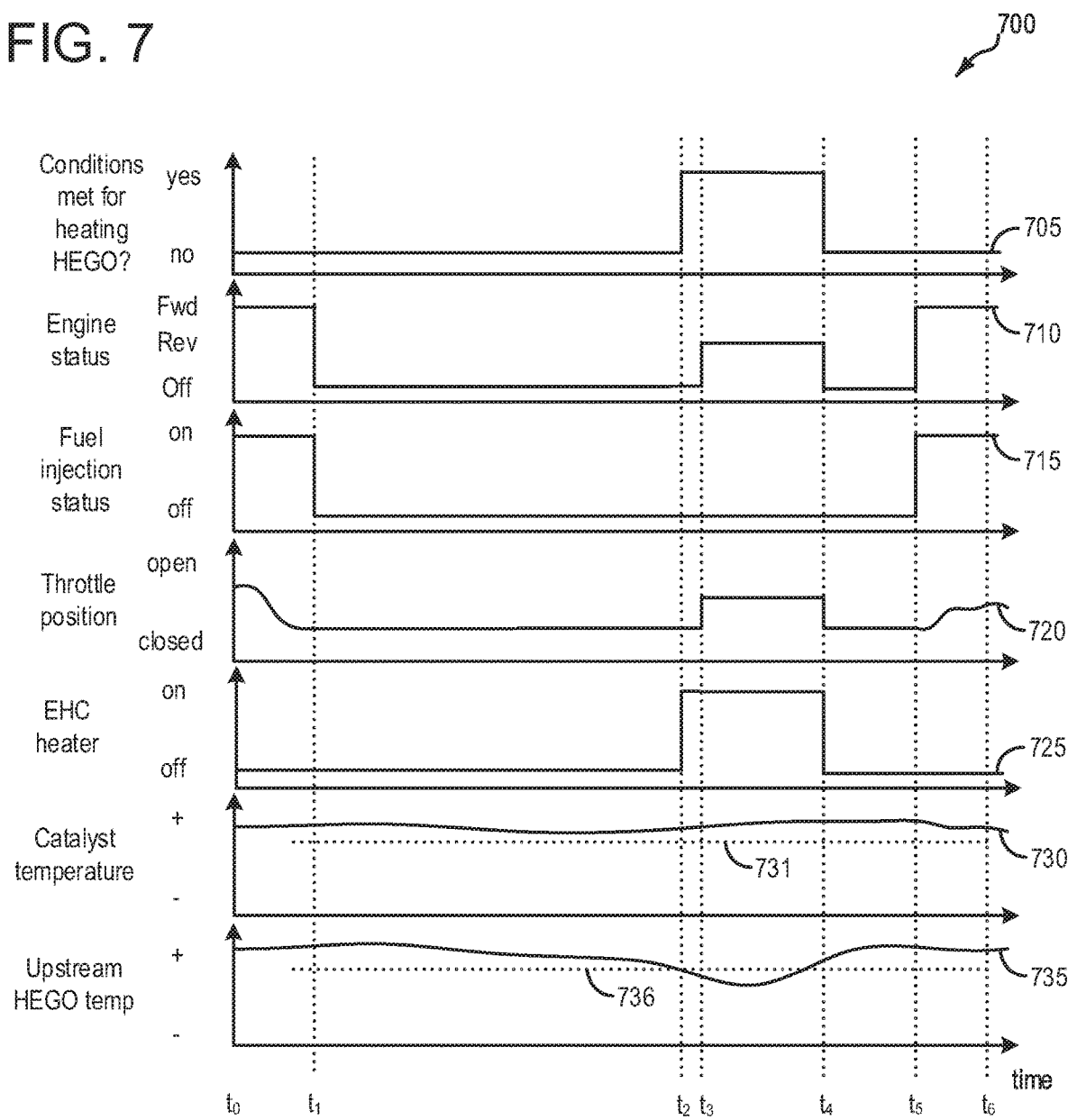
FIG. 7 depicts an example timeline for actively raising a temperature of an HEGO sensor positioned upstream of an exhaust catalyst at a S/S event.

Turning now to FIG. 7, it shows an example timeline 700 for actively raising temperature of an HEGO sensor (e.g. 237, 326) positioned upstream of an exhaust catalyst (e.g. 270, 370) at a S/S event where temperature of the HEGO sensor drops below its desired operating temperature, and where a heating element (e.g. 237a, 326a) coupled to the HEGO sensor is degraded or otherwise not functioning as desired. In other words, example timeline 700 corresponds to the first example described above with regard to FIG. 6. Timeline 700 includes plot 705, indicating whether conditions are met for actively heating the HEGO sensor (yes) or not (no), and plot 710, indicating a status of the engine, over time. The engine may be off (not rotating), or may be rotating in the forward or reverse direction. Timeline 700 further includes plot 715, indicating fuel injection status to the engine, plot 720, indicating a position of the throttle (e.g. fully open, fully closed, or somewhere between), and plot 725, indicating a status of an electrically heated catalyst (emissions control device) heater, over time. The heater, or heating element, may be on or off, over time. Timeline 700 further includes plot 730, indicating temperature of the emissions control device, or catalyst, over time. Timeline 700 further includes plot 735, indicating a temperature of the HEGO sensor positioned upstream of the emissions control device, or exhaust catalyst, over time.

At time t0, the engine is rotating in the forward direction (plot 710), and fuel is being provided to the engine (plot 715). While not explicitly illustrated, it may be understood that spark, or laser ignition energy, is also being provided to the engine cylinders at time t0. Throttle position (plot 720) is a function of driver demand. The heating element configured to heat the emissions control device is off (plot 725), temperature of the emissions control device is above its desired operating temperature (e.g. light-off temperature) (plot 730), represented by dashed line 731, and temperature of the HEGO sensor (plot 735) is above its desired operating temperature is above its desired operating temperature, represented by dashed line 736.

Between time t0 and t1, driver demand is reduced (plot 720), and at time t1 a S/S event is initiated. More specifically, the engine is deactivated (plot 710) and fuel injection to the engine cylinders is stopped (plot 715). Thus, at time t1, the engine is not combusting air and fuel.

Between time t1 and t2, temperature of the emissions control device (plot 730), and temperature of the HEGO sensor (plot 735) remains above their respective desired operating temperatures. However, at time t2, temperature of the HEGO sensor drops below its desired operating temperature. Thus, the controller, at time t2, determines whether conditions are met for actively raising temperature of the HEGO sensor, and accordingly, at time t2 it is indicated that such conditions are met. Such conditions have been described in detail above at FIG. 6, and thus will not be reiterated here for brevity. However, it may be understood that the heating element configured to raise temperature of the HEGO sensor, is indicated to be degraded or otherwise not functioning as desired. Thus, active heating of the HEGO sensor via other means is desired.

Accordingly, the heating element coupled to the emissions control device is activated at time t2 (plot 725). At time t3, the engine is rotated unfueled in reverse (plots 710 and 715), and the throttle is commanded to a position where heat may be sequestered near the HEGO sensor, but where undesirable pressure build-up in the engine system is avoided.

Between time t3 and t4, with the heating element for heating the emissions control device activated, and with the engine being rotated in reverse, temperature of the HEGO sensor rises (plot 735). It may be understood that the engine may be rotated at a predetermined RPM in reverse in order to route heat from the emissions control device to the HEGO sensor.

Between time t3 and t4, temperature of the HEGO sensor rises to above its desired operating temperature (plot 735). Accordingly, at time t4, conditions are no longer indicated to be met for actively raising temperature of the HEGO (plot 705). Thus, the engine is stopped from being rotated in reverse unfueled (plot 710), the throttle is returned to its default position it was in prior to the active heating operation (plot 720), and the heating element for heating the emissions control device is turned off (plot 725).

Between time t4 and t5, temperature of the HEGO sensor remains above its desired operating temperature (plot 735), as does temperature of the emissions control device (plot 730). Accordingly, no further action is taken between time t4 and t5.

At time t5, an engine torque request greater than a predetermined threshold is initiated, and thus the engine is reactivated to rotate in the forward direction (plot 710) with fuel injection provided. While not explicitly illustrated, it may be understood that engine activation may include rotation via a starter motor, which has been omitted for brevity.

Between time t5 and t6, throttle position (plot 720) varies as a function of driver demand, while the engine operates to combust air and fuel for propelling the vehicle.

Figure 8:
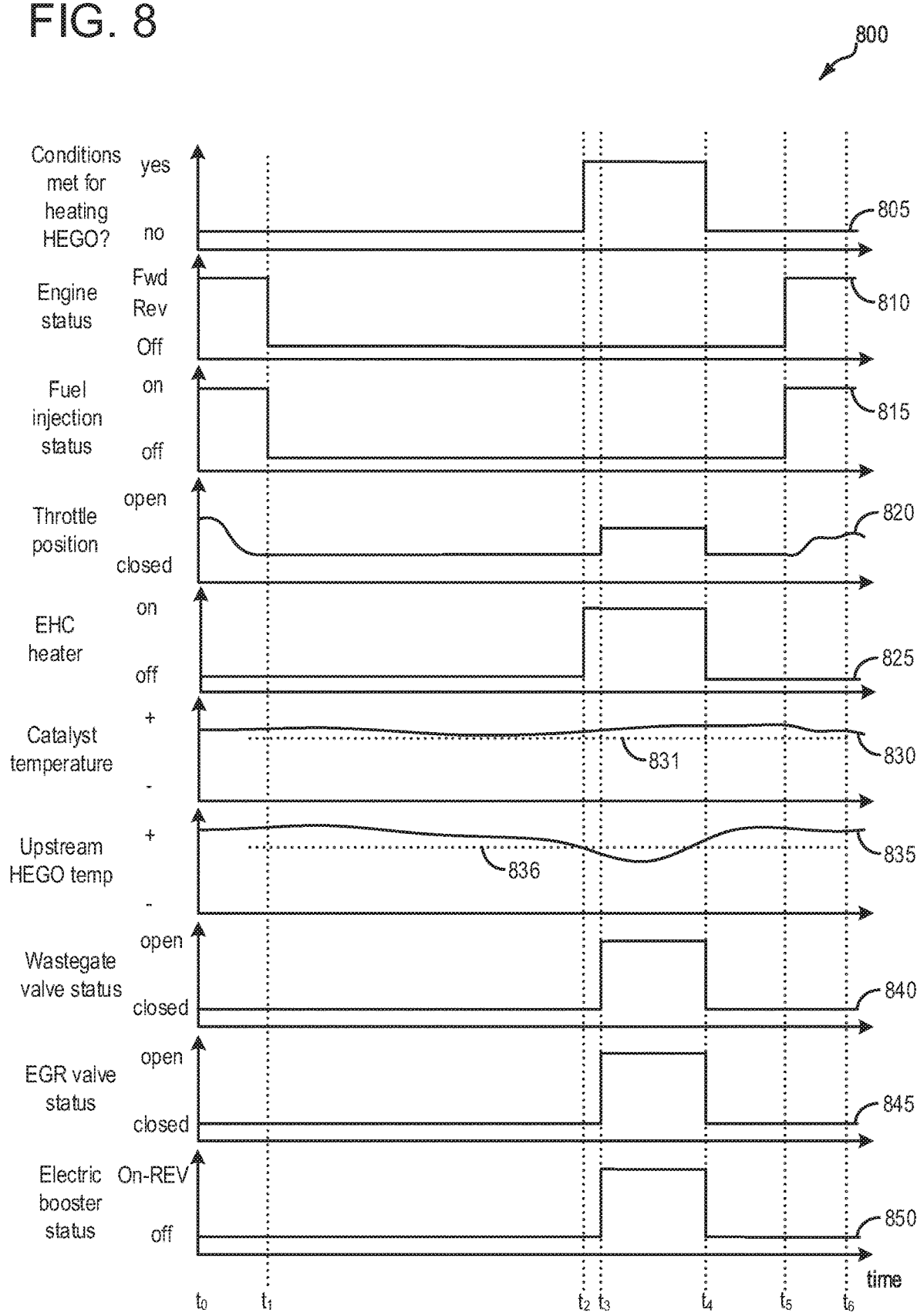
FIG. 8 depicts another example of a timeline for actively raising a temperature of an HEGO sensor positioned upstream of an exhaust catalyst at a S/S event.

Turning now to FIG. 8, it shows an example timeline 800 for actively raising temperature of an HEGO sensor (e.g. 237, 326) positioned upstream of an exhaust catalyst (e.g. 270, 370) at a S/S event where temperature of the HEGO sensor drops below its desired operating temperature, and where a heating element (e.g. 237a, 326a) coupled to the HEGO sensor is degraded or otherwise not functioning as desired. In example timeline 800 the method selected for actively raising temperature of the HEGO sensor includes rotating an electric booster in reverse. Accordingly, example timeline 800 corresponds to the second example described above with regard to FIG. 6. It may be understood that such a selection may be based on current charging state of the onboard energy storage device, as rotating the electric booster in reverse may be less energetically demanding or costly than rotating the engine unfueled in reverse. Timeline 800 includes plot 805, indicating whether conditions are met for actively heating the HEGO sensor (yes) or not (no), and plot 810, indicating a status of the engine, over time. The engine may be off (not rotating), or may be rotating in the forward or reverse direction. Timeline 800 further includes plot 815, indicating fuel injection status to the engine, plot 820, indicating a position of the throttle (e.g. fully open, fully closed, or somewhere between), and plot 825, indicating a status of an electrically heated catalyst (emissions control device) heater, over time. Timeline 800 further includes plot 830, indicating temperature of the emissions control device, or catalyst, over time. Timeline 800 further includes plot 835, indicating a temperature of the HEGO sensor positioned upstream of the emissions control device, or exhaust catalyst, over time. Timeline 800 further includes plot 840, indicating a wastegate status (fully open or fully closed), plot 845, indicating a status of an EGR valve (fully open or fully closed), and plot 850, indicating a status of an electric booster (off, or on in reverse), over time.

At time t0, the engine is rotating in the forward direction (plot 810), with fuel injection being provided to the engine (plot 815). While not explicitly illustrated, it may be understood that spark or laser ignition energy is also being provided to the engine cylinders. In other words, at time t0, the engine is combusting air and fuel. The throttle (plot 820) is controlled as a function of driver demand. The emissions control device is not being heated (plot 825), as the engine is in operation and as the temperature of the emissions control device (plot 830), is above its desired operating temperature, represented by line 831. Furthermore, temperature of the HEGO sensor positioned upstream of the emissions control device is above its desired operating temperature, represented by line 836. The wastegate is closed (plot 840), the EGR valve is closed (plot 845), and the electric booster is not in operation (plot 850). Conditions are not yet met for actively heating the HEGO (plot 805). While not explicitly illustrated, it may be understood that the heating element (e.g. 237a, 326a) for heating the HEGO sensor, is indicated to be degraded or otherwise not functioning as desired.

Between time t0 and t1, driver demand is reduced (plot 820), and at time t1 a S/S event is initiated. More specifically, the engine is deactivated (plot 810), and fuel injection to the engine cylinders is stopped (plot 815). While not explicitly illustrated, at time t1 it may be understood that spark or laser ignition energy to the engine cylinders is also discontinued.

With the engine stopped from combusting air and fuel at time t1, catalyst temperature drops slightly (plot 830), and temperature of the HEGO sensor positioned upstream of the emissions control device decreases. At time t2, temperature of the upstream HEGO sensor drops below its desired operating temperature, represented by line 836. Accordingly, as it has been determined via the controller that the heating element coupled to the HEGO sensor is not functioning as desired, conditions are indicated to be met for actively raising temperature of the HEGO sensor (plot 805). In this example timeline, while not explicitly illustrated, it may be understood that with conditions being met at time t2, the controller selects a method for actively raising temperature of the HEGO sensor that includes use of the electric booster, rather than rotation of the engine in reverse (or use of laser ignition device(s)). Such a method may be selected, for example, based on current determination of charge state of the onboard energy storage device. More specifically, charge state below a predetermined charge state threshold may make it more desirable to conduct the active raising of the temperature of the HEGO sensor via the electric booster, than rotation of the engine in reverse. In another example, such a determination may be made simply based on whether an electric booster is included in the engine system. Such a determination may further be based on the engine comprising a variable displacement engine, for example.

With the method of actively raising the temperature of the HEGO sensor selected at time t2, the heater coupled to the emissions control device is activated (plot 825). At time t3, the wastegate is commanded open (plot 840), the EGR valve is commanded open (plot 845), the throttle is commanded to an at least partially open position (plot 820), the position comprising a position where pressure build-up in the engine intake is kept below an undesirable level, but where a desirable amount of heat may be sequestered in the vicinity of the HEGO sensor. Furthermore, while not explicitly illustrated, it may be understood that at time t3, the engine cylinders may be sealed (e.g. intake and exhaust valves commanded closed via VDE actuators). However, in other examples, the engine cylinders may not be sealed without departing from the scope of this disclosure. For example, as the engine presents a large resistance to air flow, air may preferentially be routed around the engine via the EGR passage even if the engine cylinders are not actively sealed. Still further, while not explicitly illustrated, it may be understood that time t3 that the electric booster bypass valve (e.g. 361) is commanded or maintained closed.

At time t3, with the throttle controlled to its desired position, the wastegate and the EGR valves commanded fully open, the engine cylinders sealed, and the electric booster bypass valve commanded fully closed, the electric booster is activated on, in reverse. Reverse operation may be enabled via an H-bridge, such as discussed above. Speed of the rotation of the electric booster in reverse may comprise a predetermined speed (RPM), for example.

With the electric booster activated on, between time t3 and t4, temperature of the HEGO sensor positioned upstream of the emissions control device, rises, and becomes greater than the desired operating temperature represented by line 836. At time t4, as the HEGO sensor temperature has reached/exceeded its desired operating temperature, conditions are no longer indicated to be met for actively heating the HEGO sensor (plot 805). Accordingly, the throttle (plot 820) is returned to the position it was in prior to conducting the active HEGO heating diagnostic, the heating coupled to the emissions control device is turned off (plot 825), the wastegate (plot 840) and the EGR valve (plot 845) are both commanded fully closed, and the electric booster is deactivated (plot 850). Between time t4 and t5, temperature of the HEGO sensor and temperature of the emissions control device, or exhaust catalyst, remain above their respective desired operating temperatures. Accordingly, no further action is taken between time t4 and t5.

At time t5, an engine torque demand request greater than a threshold torque demand is indicated/determined via the controller. Accordingly, the engine is activated to rotate in the forward direction (plot 810), and fuel injection is provided to the engine cylinders (plot 815). In other words, the engine is activated to combust air and fuel at time t5. Such action, as discussed above, may include a starter motor initially rotating the engine, until the engine may be rotated on its own via combusting air and fuel. However, such detail is not included at timeline 800 for brevity/clarity. Furthermore, it may be understood that upon activation of the engine and providing fuel injection to engine cylinders, spark or laser ignition energy may additionally be provided to engine cylinders. With the engine combusting air and fuel, between time t5 and t6, the throttle is controlled as a function of driver-demand (plot 820).

Figure 9:
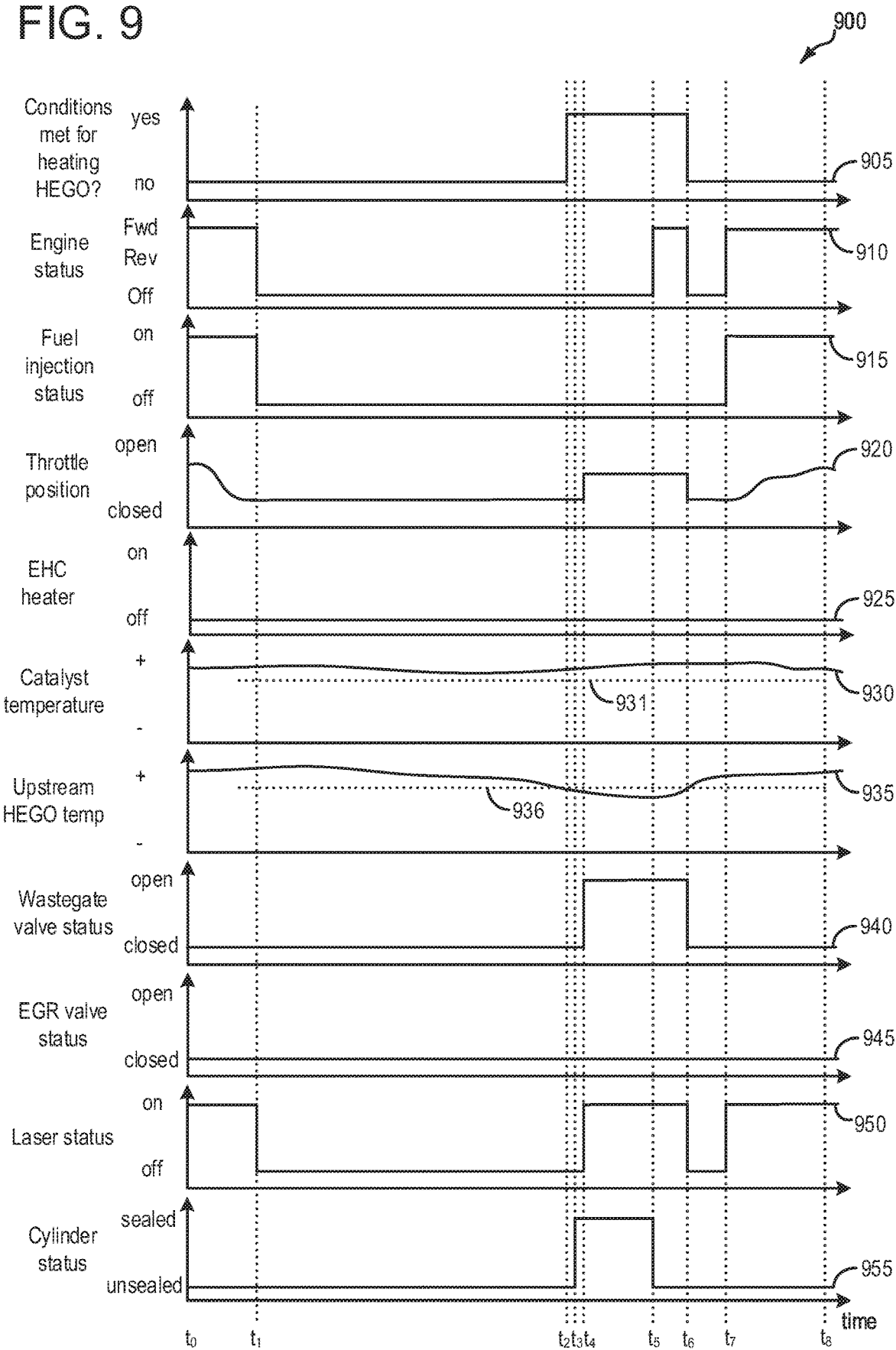
FIG. 9 depicts yet another example of a timeline for actively raising a temperature of an HEGO sensor positioned upstream of an exhaust catalyst at a S/S event.

Turning now to FIG. 9, another example timeline 900 is shown for actively raising temperature of an HEGO sensor (e.g. 237, 326) positioned upstream of an exhaust catalyst (e.g. 270, 370) at a S/S event where temperature of the HEGO sensor drops below its desired operating temperature, and where a heating element (e.g. 237a, 326a) coupled to the HEGO sensor is degraded or otherwise not functioning as desired. In example timeline 900 the method selected for actively raising temperature of the HEGO sensor includes use of a laser ignition device to inducing heat generation in engine cylinders, where such heat generation may subsequently be routed to the HEGO sensor to raise temperature of said HEGO sensor to or above its desired operating temperature. Accordingly, example timeline 900 corresponds to the third example described above with regard to FIG. 6. Timeline 900 includes plot 905, indicating whether conditions are met for actively heating the HEGO sensor, plot 910, indicating status of the engine (off, or rotating in the forward or reverse direction), plot 915, indicating status of fuel injection to the engine, and plot 920, indicating throttle position (fully open or fully closed, or somewhere between), over time. Timeline 900 further includes plot 925, indicating status (on or off) of a heating element coupled to the emissions control device or exhaust catalyst, over time. Timeline 900 further includes plot 930, indicating temperature of the emissions control device, and plot 935, indicating temperature of the HEGO sensor positioned upstream of the emissions control device, over time. Timeline 900 further includes plot 940, indicating status (fully open or fully closed) of a wastegate, plot 945, indicating status (fully open or fully closed) of an EGR valve, plot 950, indicating status (on or off) of laser ignition device(s) coupled to engine cylinder(s), and plot 955, indicating status (sealed or unsealed) of engine cylinders, over time. As discussed, and while not explicitly illustrated, it may be understood that for timeline 900, the heating element coupled to the HEGO sensor is known to be degraded.

At time t0, conditions are not yet indicated to be met for actively heating the HEGO sensor (plot 905). The engine is rotating in the forward direction (plot 910), fuel injection is being provided to engine cylinders (plot 915), and laser ignition energy is being provided to engine cylinders (plot 950). In other words, the engine is combusting air and fuel in order to propel the vehicle. The throttle position (plot 920) at time t0 is a function of driver demand, emissions control device temperature (plot 930) is above its threshold temperature or desired operating temperature, represented by line 931, and the HEGO sensor (plot 935) is above its threshold temperature or desired operating temperature, represented by line 936. Accordingly, the heater or heating element coupled to the emissions control device is off (plot 925). Furthermore, the wastegate is closed (plot 940), the EGR valve is closed (plot 945), and engine cylinders have not been actively sealed (plot 950).

Between time t0 and t1, driver demand is reduced (plot 920), and at time t1 a S/S event is initiated. Accordingly, the engine is deactivated (plot 910), fuel injection to engine cylinders is stopped (plot 915), and the laser ignition device(s) are deactivated (plot 950). Between time t1 and t2, with the engine not combusting, temperature of the HEGO sensor decreases (plot 935). At time t2, temperature of the HEGO sensor (plot 935) drops below the threshold temperature or desired operating temperature, represented by line 936. Accordingly, as the HEGO sensor heating element has been determined to be degraded, conditions are indicated to be met for actively heating the HEGO sensor (plot 905). Thus, at time t2, it may be understood that a selection as to methodology to use to actively raise temperature of the HEGO sensor may be made via the controller. Such a selection in this example is made based on the inclusion of laser ignition devices in the engine system, in conjunction with the engine comprising a variable displacement engine. Accordingly, at time t3, engine cylinders are actively sealed (plot 955), for example via the controller sending signals to VDE actuators, thus actuating closed intake and exhaust valve(s) coupled to engine cylinders. While not explicitly illustrated, it may be understood that any number of cylinders may be actively sealed at time t3.

Whichever cylinders are actively sealed at time t3, laser ignition energy is provided to said cylinders at time t4 (plot 950). Furthermore, at time t3, the throttle (plot 920) is controlled to its desired position, the wastegate (plot 940) is commanded fully open, and the EGR valve is maintained/commanded closed (plot 945). With the laser ignition energy provided to sealed cylinders, between time t4 and t5, heat is generated in said sealed cylinders. The amount of ignition energy provided, and the duration for which said ignition energy is provided, may comprise a predetermined amount and duration, respectively. The ignition energy may be provided in pulses, where a rate of pulses may comprise a predetermined pulse rate. In some examples, in-cylinder temperature sensors may be included in order to raise temperature in the cylinders to a desired temperature for actively heating the HEGO sensor.

At time t5, the cylinders are commanded unsealed (plot 955), and the engine is commenced rotating in the forward direction (plot 910), unfueled (plot 915). Such engine rotation routes the trapped in-cylinder heat to the HEGO sensor positioned upstream of the emissions control device. In this example timeline, the laser ignition energy is continued to be provided at time t5, yet in other examples, the laser ignition energy provided may be discontinued in response to the engine being rotated forward unfueled. Furthermore, while not explicitly illustrated, it may be understood that in some examples, as discussed above, rather than rotating the engine unfueled to transfer heated in-cylinder gas to the HEGO sensor, the electric booster may be rotated electrically in a forward direction to provide compressed air for transferring heated in-cylinder gas to the HEGO sensor. In such an example, it may be understood that the cylinder being unsealed may also refer to the cylinder that received laser ignition energy, being positioned or controlled such that both its intake valve and exhaust valve may be both at least partially open.

Between time t5 and t6, temperature of the HEGO sensor rises (plot 935), and at time t6, the temperature reaches its desired operating temperature. With the HEGO sensor having reached its desired operating temperature, conditions are no longer indicated to be met for actively heating the HEGO sensor (plot 905). Accordingly, the throttle (plot 920) is returned to the position it was in prior to actively raising the HEGO sensor temperature, the wastegate is commanded closed (plot 940), and the laser ignition device(s) (plot 950) are deactivated, or turned off. Furthermore, the engine is stopped from rotating in the forward direction (plot 910), unfueled (plot 915).

Between time t6 and t7, temperature of the HEGO sensor remains above its threshold/desired operating temperature, and thus no further action is undertaken. At time t7, driver demand for engine torque exceeds a predetermine threshold demand, and thus, the engine is activated to rotate in the forward direction (plot 910), with fuel injection (plot 915) and laser ignition energy (plot 950) provided to engine cylinders. As discussed, a starter motor may initially be used to rotate the mass of the engine until the engine may be rotated under its own power from combustion, but such detail is omitted for brevity. Between time t7 and t8, the throttle is controlled as a function of driver demand, as the engine propels the vehicle.

Figure 10:
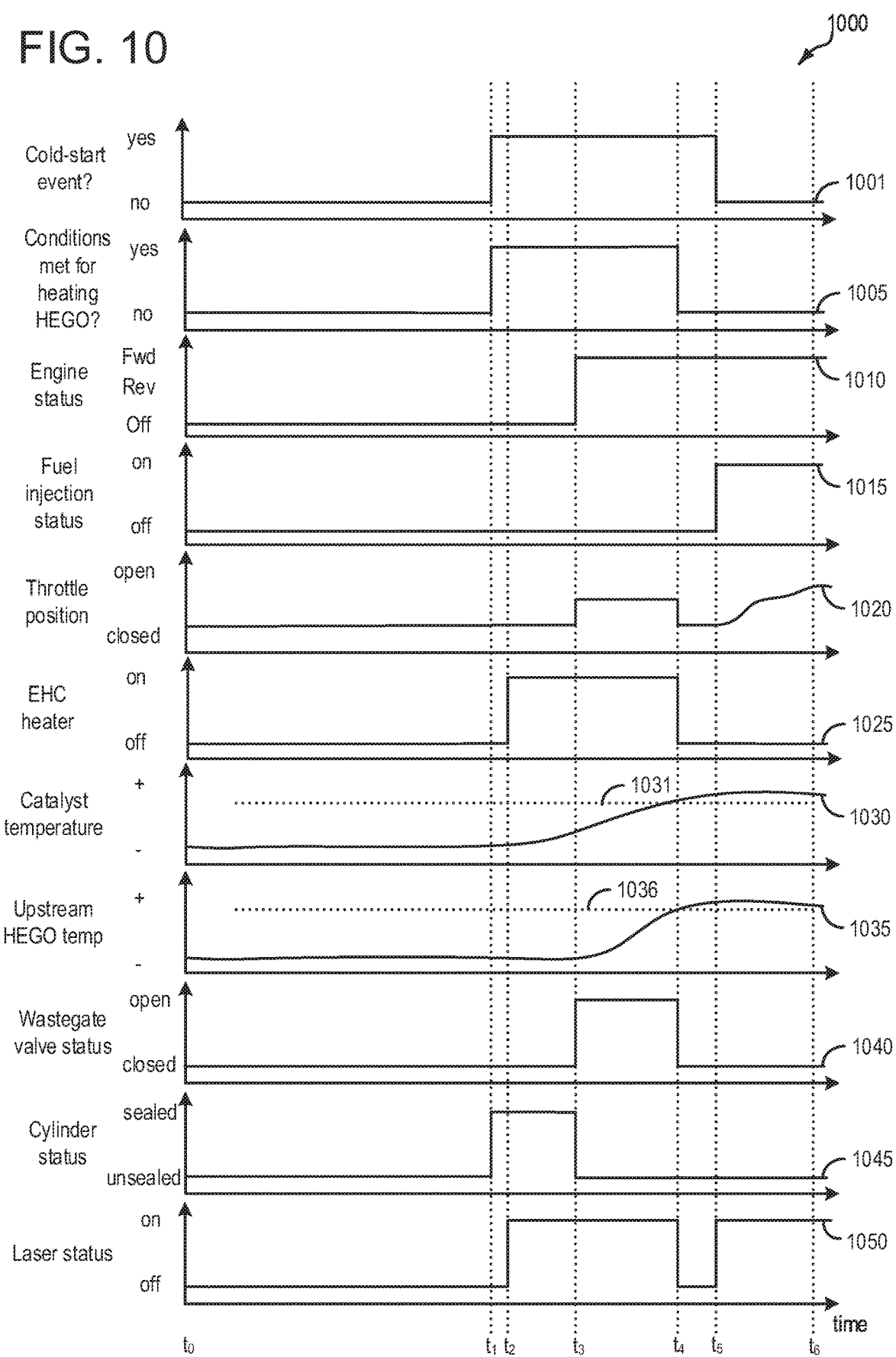
FIG. 10 depicts an example timeline for actively raising a temperature of an HEGO sensor positioned upstream of an exhaust catalyst at a cold-start event.

Turning now to FIG. 10, an example timeline 1000 is shown for actively raising temperature of an HEGO sensor (e.g. 237, 326) positioned upstream of an exhaust catalyst (e.g. 270, 370) at a cold-start event, where a heating element (e.g. 237a, 326a) coupled to the HEGO sensor is degraded or otherwise not functioning as desired or expected. In example timeline 1000, the method selected for actively raising temperature of the HEGO sensor includes use of a laser ignition device(s) to induce heat generating in engine cylinders, where such heat generation may subsequently be routed to the HEGO sensor to raise temperature of said HEGO sensor to or above its desired operating temperature. Accordingly, timeline 1000 corresponds to the fourth example described above with regard to FIG. 6. Timeline 1000 includes plot 1001, indicating whether a cold-start event is indicated/determined (yes or no) via the vehicle controller, over time. Timeline 1000 further includes plot 1005, indicating whether conditions are indicated (yes or no) to be met for actively heating the HEGO sensor, plot 1010, indicating engine status (off, or rotating in the forward or reverse direction), plot 1015, indicating fuel injection status (on or off) to engine cylinders, plot 1020, indicating position of an intake throttle (fully open, fully closed, or somewhere between), and plot 1025, indicating status (on or off) of a heating element coupled to the emissions control device, over time. Timeline 1000 further includes plot 1030, indicating temperature of the emissions control device, and plot 1035, indicating temperature of the HEGO sensor positioned upstream of the emissions control device or catalyst, over time. Timeline 1000 further includes plot 1040, indicating a status (fully open or fully closed), of a wastegate, plot 1045, indicating a status (sealed or unsealed) of engine cylinders, and plot 1050, indicating status (on or off) of laser ignition device(s) configured to provide laser ignition energy to engine cylinders, over time.

At time t0, a cold-start event is not indicated (plot 1001). In other words, a key-on event has not occurred, and there is no request for engine torque. Accordingly, conditions are not met for actively heating the HEGO sensor (plot 1005), the engine is off (plot 1010), fuel injection to the engine cylinders is off (plot 1015), the throttle is in a key-off default position (plot 1020), the heater or heating element coupled to the emissions control device or catalyst is off (plot 1025), the catalyst temperature is low (plot 1030), HEGO sensor temperature is low (plot 1035), the waste gate is closed (plot 1040), the engine cylinders have not been actively sealed (plot 1045), and the laser ignition device(s) are off (plot 1050).

Between time t0 and t1, such conditions as that described for time t0 are maintained. At time t1, a cold-start event is initiated (plot 1001). Accordingly, as the HEGO sensor heating element is indicated to be degraded, conditions are indicated to be met for actively raising temperature of the HEGO sensor (plot 1005). At time t1, it may be understood that the controller may make a selection as to what methodology to use to raise temperature of the HEGO sensor to or above its desired operating temperature. In this example timeline 1000, it may be understood that the method selected includes using laser ignition energy via the laser ignition device(s) to generate heat in engine cylinders, where such heat is then transferred or routed to the HEGO sensor for increasing its temperature. Such a method may be selected responsive to an indication that the engine system includes laser ignition devices, and engine cylinders capable of being actively sealed, such as, for example, a variable displacement engine. However, it may be understood that such a method may not be carried out only in variable displacement engines, as an engine may be controlled (e.g. via unfueled rotation) to a position where at least one cylinder may have both intake and exhaust valves closed. However, in this example timeline, the engine comprises a variable displacement engine.

Accordingly, at time t1, with such a method selected, engine cylinders are commanded sealed (plot 1045) via, for example, the controller sending a signal to VDE actuators, thus commanding intake and exhaust valves for engine cylinders sealed. Any number of engine cylinders may be sealed in this fashion. At time t2, laser ignition device(s) are actuated on (plot 1050). It may be understood that said laser ignition devices are actuated on only corresponding to those cylinders which are sealed. Furthermore, at time t2, the heater or heating element coupled to the emissions control device or exhaust catalyst is actuated on (plot 1025).

Between time t2 and t3, with the heater configured to heat the emissions control device activated, temperature of the emissions control device rises (plot 1030). At time t3, the engine cylinders are unsealed (plot 1045), the wastegate is commanded open (plot 1040), the throttle is controlled to its desired position (plot 1020), and the engine is activated to be rotated in the forward direction (plot 1010), unfueled (plot 1015). With the engine cylinders unsealed, and the engine rotating in the forward direction, trapped in-cylinder heat is transferred to the HEGO sensor to increase its temperature.

Accordingly, between time t3 and t4, temperature of the HEGO sensor positioned upstream of the exhaust catalyst (plot 1035) rises, and temperature of the exhaust catalyst also rises (plot 1030). It may be understood that the increase in temperature of the exhaust catalyst may be due in part to the heating element coupled to the emissions control device, or exhaust catalyst, being activated, and may further be due in part to the heat routed from the cylinders to the exhaust system via forward unfueled engine rotation.

At time t4, temperature of the exhaust catalyst and temperature of the HEGO sensor reach their desired operating temperatures, represented by lines 1031 and 1036, respectively. Accordingly, conditions are no longer indicated to be met for actively heating the HEGO sensor (plot 1005). Accordingly, the throttle (plot 1020) is returned to the position it was in prior to conducting the diagnostic to raise temperature of the HEGO sensor, the heater coupled to the emissions control device (plot 1025) is deactivated, the wastegate is commanded closed (plot 1040), and the laser ignition device(s) are commanded off (plot 1050). The engine is maintained being rotated in the forward direction between time t4 and t5, and at time t5 fuel injection and laser ignition energy is provided to the engine cylinders (plots 1015 and 1050). With fuel injection and laser ignition energy provided to the engine cylinders, it may be understood that the engine is combusting air and fuel at time t5. Between time t5 and t6, the throttle is controlled as a function of driver demand.

Figure 11:
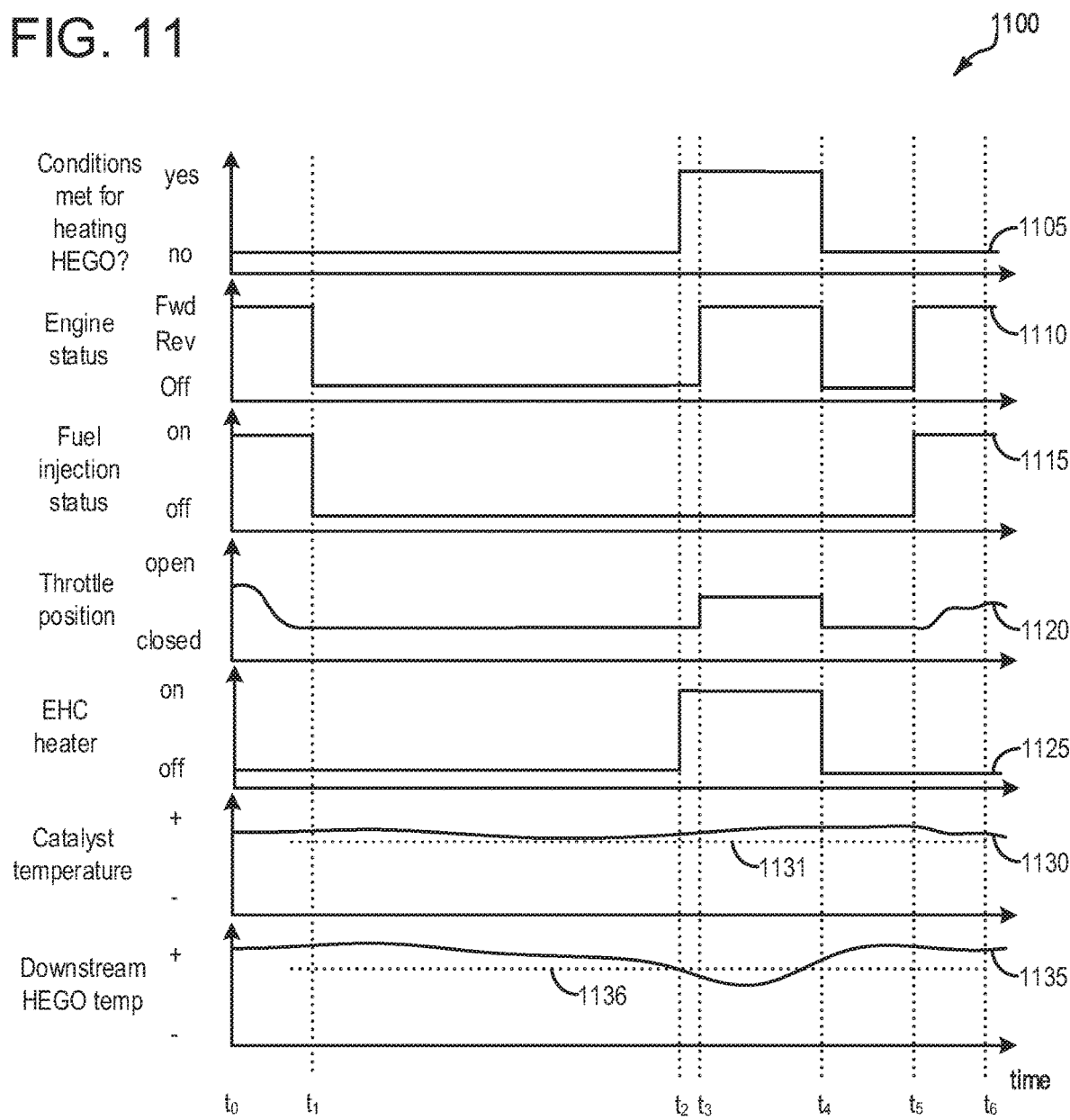
FIG. 11 depicts an example timeline for actively raising a temperature of an HEGO sensor positioned downstream of an exhaust catalyst at a cold-start event.

Turning now to FIG. 11, an example timeline 1100 is shown, for actively raising a temperature of a HEGO sensor positioned downstream of an emissions control device, said HEGO sensor herein referred to as CMS (e.g. 298, 398), under conditions where it has been determined that heating elements (e.g. 298a, 398a) configured to heat the CMS, are degraded or otherwise not functioning as desired or expected. Timeline 1100 depicts an example where such active heating of the CMS is conducting during a S/S event where, due to the engine being off, temperature of the CMS decreases to below its desired operating temperature, or threshold temperature. Thus, timeline 1110 represents a timeline corresponding to the fifth example, discussed above with regard to FIG. 6. Timeline 1100 includes plot 1105, indicating whether conditions are met (yes or no) for actively heating the HEGO sensor (CMS) positioned downstream of the emissions control device, plot 1110, indicating engine status (off, or rotating in the forward or reverse direction), plot 1115, indicating fuel injection status (on or off) to engine cylinders, plot 1120, indicating a position (fully open, fully closed, or somewhere between) of an intake throttle, plot 1125, indicating a status (on or off) of a heater or heating element coupled to the emissions control device, plot 1130, indicating a temperature of the emissions control device, or exhaust catalyst, and plot 1135, indicating temperature of the CMS, over time.

At time t0, conditions are not indicated to be met for actively heating the CMS (plot 1105). The engine is rotating the forward direction (plot 1110), and fuel injection is being provided to engine cylinders (plot 1115). While not explicitly illustrated, it may be understood that spark or laser ignition energy is also being provided to engine cylinders at time t0. In other words, at time t0, the engine is combusting air and fuel to propel the vehicle. The throttle position (plot 1120) is a function of driver demand, and as the engine is in operation the heater coupled to the emissions control device (plot 1125) is off. Further, temperature of the emissions control device (plot 1130) is above its threshold temperature, or desired operating temperature, represented by line 1131, and temperature of the CMS (plot 1135) is above its threshold temperature or desired operating temperature, represented by line 1136.

Between time t0 and t1, driver demand decreases (plot 1120), and at time t1 a S/S event is initiated. Accordingly, the engine is deactivated (plot 1110), fuel injection to the engine is stopped (plot 1115), and spark or laser ignition energy, while not explicitly illustrated, is also stopped at time t1.

Between time t1 and t2, with the engine not combusting air and fuel, temperature of the CMS decreases, and at time t2, temperature of the CMS drops below its desired operating temperature, represented by line 1136. Accordingly, conditions are indicated to be met for actively heating the CMS (plot 1105), and thus it may be understood that the controller selects a method for actively raising temperature of the CMS. In this example timeline, the method selected includes activation of the heating element coupled to the emissions control device, followed by unfueled forward rotation of the engine. Such a method may be selected for example, if the engine is indicated to not be equipped with an electric booster, if ignition energy is provided to the engine cylinders via spark plugs rather than laser ignition devices, if charge state of the onboard energy storage device is greater than a predetermined threshold charge state, etc.

With such a method selected, at time t2 the heater coupled to the emissions control device is activated (plot 1125). At time t3, the throttle is controlled to its desired position (plot 1120), and the engine is activated to rotate in the forward direction via the motor (plot 1110), unfueled (plot 1115). Between time t3 and t4, heat from the emissions control device is routed to the CMS, an accordingly, CMS temperature increases (plot 1135) to above the threshold temperature, or desired operating temperature. Accordingly, at time t4, as CMS temperature has been actively raised to above the threshold temperature, conditions are no longer indicated to be met for actively heating the CMS (plot 1105). Thus, at time t4, the engine is stopped from rotating unfueled (plot 1110), the throttle (plot 1120) is commanded to its position it was in prior to conducting the active heating diagnostic, and the heater coupled to the emissions control device is deactivated (plot 1125). Between time t4 and t5, temperature of the CMS (plot 1135) remains above the threshold temperature represented by line 1136, and thus no further action is taken.

At time t5, engine torque demand is greater than a threshold, and accordingly the engine is activated to rotate in the forward direction (plot 1110), and fueling is provided to the engine cylinders (plot 1115). While not explicitly illustrated, it may be understood that at time t5, spark or laser ignition energy is provided to engine cylinders. In other words, at time t5 engine combustion is initiated. As discussed, a starter motor may initially be used to rotate the engine mass, however such a step is not indicated here for brevity.

Between time t5 and t6, the throttle is controlled as a function of driver demand.

The timelines depicted at FIGS. 7-11 show a select number of the examples described in relation to the method of FIG. 6. While not every variation of all examples are shown, it may be understood that any variation described above with regard to FIG. 6 may be utilized for actively raising temperature of a HEGO sensor positioned upstream of an emissions control device, or a HEGO sensor positioned downstream of the emissions control device, depending on current vehicle/engine operating conditions, and further a function of componentry included in the particular vehicle/engine system undergoing the active HEGO sensor heating diagnostic. In this way, under conditions where heating elements configured to increase temperature of HEGO sensors positioned either upstream or downstream of an emissions control device are indicated to be degraded, active heating using the systems and methods discussed herein may enable said HEGO sensors to be heated to or above their desired operating temperatures at S/S events or cold-start events. Such action may reduce undesired emissions to atmosphere, may increase lifetime of emission control devices positioned in engine exhaust systems, and may increase engine lifetime.

The technical effect is to recognize that under situations where heating elements configured to raise HEGO sensor temperature are indicated to be degraded, alternative heat sources may be utilized to increase HEGO sensor temperature to or above its desired operating temperature at S/S events or cold-start events. Thus, a further technical effect is to recognize that hybrid vehicles may have means for routing heat generated from said alternative heat sources to the HEGO sensors, via the use of energy stored onboard, for example at an onboard energy storage device. Thus, one technical effect is to recognize that heat from an emissions control device may be routed to HEGO sensors, whereas another technical effect is to recognize that trapped in-cylinder heat generated via laser ignition devices may be used to raise temperature of HEGO sensors. Another technical effect is thus to recognize that various methodology may be used to route the heat to HEGO sensors, including unfueled engine rotation, or operating of an electric booster positioned in engine intake. A still further technical effect is to recognize that there may be circumstances where particular methodology to raise temperature of HEGO sensors is more desirable, than other potential methodology, and thus such method selection may be based on current vehicle operating parameters, engine system componentry, etc.

The systems described herein, and with reference to FIGS. 1-5B, along with the methods described herein, and with reference to FIG. 6, may enable one or more systems and one or more methods. In one example, a method comprises reducing undesired emissions at a start event of an engine that propels a vehicle under conditions where a temperature of a heated exhaust gas oxygen sensor is below its desired operating temperature and where a heating element configured to heat the sensor is degraded, by providing an alternative heat source and actively routing heat from said source to the sensor to raise the temperature of the sensor to its desired operating temperature. In a first example of the method, the method further includes wherein the start event of the engine comprises a cold-start event. A second example optionally includes the first example, and further includes wherein the start event of the engine comprises a start/stop event where the temperature of the sensor has decreased to below its desired operating temperature while the engine is not combusting air and fuel. A third example optionally includes any one or more or each of the first through second examples, and further includes wherein reducing undesired emissions includes reducing undesired emissions at the start event as compared to conditions where the heated exhaust gas oxygen sensor remains below its desired operating temperature for the start event. A fourth example optionally includes any one or more or each of the first through third examples, and further includes wherein actively routing heat from said source to the sensor includes one of rotating the engine unfueled in a forward or reverse direction or rotating an electric booster positioned in an intake of the engine in the forward or reverse direction, the forward or reverse direction for both rotating the engine and for rotating the electric booster selected based on a position of the sensor with respect to an emissions control device positioned in an exhaust system of the engine of the vehicle and the alternative heat source. A fifth example optionally includes any one or more or each of the first through fourth examples, and further comprises rotating the engine unfueled in reverse, or rotating the electric booster in reverse, under conditions where the sensor is positioned upstream of the emissions control device and where the alternative heat source comprises a heater configured to heat the emissions control device; rotating the engine unfueled in the forward direction or rotating the electric booster in the forward direction under conditions where the sensor is positioned upstream of the emissions control device and where the alternative heat source comprises one or more laser ignition devices configured to provide laser ignition energy to one or more cylinders of the engine; and rotating the engine unfueled in the forward direction or rotating the electric booster in the forward direction under conditions where the sensor is positioned downstream of the emissions control device and where either or both of the heater configured to heat the emissions control device and/or the one or more laser ignition devices comprise the alternative heat source. A sixth example optionally includes any one or more or each of the first through fifth examples, and further includes wherein actively routing heat from said source to the sensor includes selecting whether to use the engine in the forward or reverse direction as compared to whether to use the electric booster in the forward or reverse direction, the selecting based on at least a charge state of an onboard energy storage device that powers a motor configured to rotate the engine and electric booster in the forward or reverse directions. A seventh example optionally includes any one or more or each of the first through sixth examples, and further comprises controlling a position of an air intake throttle and/or an exhaust tuning valve, for the actively routing heat from said source to the sensor to raise the temperature of the sensor to its desired operating temperature.

Another example of a method comprises at a start-event of an engine, responsive to detection of a degraded heating element of an oxygen sensor, operating a laser ignition source of the engine without combustion and spinning an electrically-driven intake air compressor to transport heated cylinder gas to the sensor. In a first example of the method, the method further includes wherein the heating element is configured to raise temperature of the sensor and wherein the heating element and the sensor are both positioned either upstream or downstream of an emissions control device positioned in an exhaust system of the engine. A second example of the method optionally includes the first example, and further comprises sealing a cylinder of the engine while operating the laser ignition source, where the cylinder receives laser ignition energy from the laser ignition source; and unsealing the cylinder to transport heated cylinder gas to the sensor via spinning the electrically-driven intake air compressor. A third example of the method optionally includes any one or more or each of the first through second examples, and further includes wherein unsealing the cylinder further comprises positioning the cylinder with both an intake valve and an exhaust valve coupled to the cylinder at least partially open. A fourth example of the method optionally includes any one or more or each of the first through third examples, and further comprises either stopping operating the laser ignition source upon unsealing the cylinder, or maintaining operating the laser ignition source upon unsealing the cylinder for transporting cylinder gas to the sensor. A fifth example of the method optionally includes any one or more or each of the first through fourth examples, and further comprises commanding open a wastegate positioned in a wastegate passage configured to route fluid flow around a turbine to transport heated cylinder gas to the sensor. A sixth example of the method optionally includes any one or more or each of the first through fifth examples, and further comprises commanding closed an exhaust gas recirculation valve positioned in an exhaust gas recirculation passage of the engine, to transport heated cylinder gas to the sensor. A seventh example of the method optionally includes any one or more or each of the first through sixth examples, and further comprises controlling a position of an air intake throttle and/or an exhaust tuning valve for transporting heated cylinder gas to the sensor.

A system for a hybrid vehicle comprises a controller with computer readable instructions stored in non-transitory memory that, when executed, cause the controller to: activate an electric heat source and actively route heat from the electric heat source to a heated exhaust gas oxygen sensor under conditions of a start event of an engine where a heating element for the heated exhaust gas oxygen sensor is degraded, to increase temperature of the heated exhaust gas oxygen sensor to its desired operating temperature, where actively routing heat from the heat source to the heated exhaust gas oxygen sensor includes rotating the engine via a motor in a forward or reverse direction unfueled, as a function of position of the heated exhaust gas oxygen sensor with the degraded heating element, and the electric heat source. In a first example of the system, the system further includes wherein the electric heat source further comprises a heater coupled to an emissions control device positioned in an exhaust system of the engine, or one or more laser ignition devices configured to provide laser ignition energy to one or more cylinders of the engine. A second example of the system optionally includes the first example, and further comprises an intake air throttle; an exhaust tuning valve; and wherein the controller stores further instructions to control position of one or more of the throttle and/or exhaust tuning valve such that heat from the electric heat source is sequestered in a vicinity of the heated exhaust gas oxygen sensor, while undesirable pressure build-up in the engine is avoided. A third example of the system optionally includes any one or more or each of the first through second examples, and further comprises an electric booster positioned in an intake of the engine; and wherein the controller stores further instructions to select to utilize the electric booster rotated via the motor in either the forward or reverse direction rather than the engine, to actively route heat from the heat source to the heated exhaust gas oxygen sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
reducing undesired emissions at a start event of an engine that propels a vehicle under conditions where a temperature of a heated exhaust gas oxygen sensor is below its desired operating temperature and where a heating element configured to heat the sensor is degraded, by providing an alternative heat source and actively routing heat from said source to the sensor to raise the temperature of the sensor to its desired operating temperature.

2. The method of claim 1, wherein the start event of the engine comprises a cold-start event.

3. The method of claim 1, wherein the start event of the engine comprises a start/stop event where the temperature of the sensor has decreased to below its desired operating temperature while the engine is not combusting air and fuel.

4. The method of claim 1, wherein reducing undesired emissions includes reducing undesired emissions at the start event as compared to conditions where the heated exhaust gas oxygen sensor remains below its desired operating temperature for the start event.

5. The method of claim 1, wherein actively routing heat from said source to the sensor includes one of rotating the engine unfueled in a forward or reverse direction or rotating an electric booster positioned in an intake of the engine in the forward or reverse direction, the forward or reverse direction for both rotating the engine and for rotating the electric booster selected based on a position of the sensor with respect to an emissions control device positioned in an exhaust system of the engine of the vehicle and the alternative heat source.

6. The method of claim 5, further comprising rotating the engine unfueled in reverse, or rotating the electric booster in reverse, under conditions where the sensor is positioned upstream of the emissions control device and where the alternative heat source comprises a heater configured to heat the emissions control device;

rotating the engine unfueled in the forward direction or rotating the electric booster in the forward direction under conditions where the sensor is positioned upstream of the emissions control device and where the alternative heat source comprises one or more laser ignition devices configured to provide laser ignition energy to one or more cylinders of the engine; and rotating the engine unfueled in the forward direction or rotating the electric booster in the forward direction under conditions where the sensor is positioned downstream of the emissions control device and where either or both of the heater configured to heat the emissions control device and/or the one or more laser ignition devices comprise the alternative heat source.

7. The method of claim 5, wherein actively routing heat from said source to the sensor includes selecting whether to use the engine in the forward or reverse direction as compared to whether to use the electric booster in the forward or reverse direction, the selecting based on at least a charge state of an onboard energy storage device that powers a motor configured to rotate the engine and electric booster in the forward or reverse directions.

8. The method of claim 1, further comprising controlling a position of an air intake throttle and/or an exhaust tuning valve, for the actively routing heat from said source to the sensor to raise the temperature of the sensor to its desired operating temperature.

9. A method, comprising:
at a start-event of an engine, responsive to detection of a degraded heating element of an oxygen sensor, operating a laser ignition source of the engine without combustion and spinning an electrically-driven intake air compressor to transport heated cylinder gas to the sensor.

10. The method of claim 9, wherein the heating element is configured to raise a temperature of the sensor and wherein the heating element and the sensor are both positioned either upstream or downstream of an emissions control device positioned in an exhaust system of the engine.

11. The method of claim 9, further comprising sealing a cylinder of the engine while operating the laser ignition source, where the cylinder receives laser ignition energy from the laser ignition source; and
unsealing the cylinder to transport heated cylinder gas to the sensor via spinning the electrically-driven intake air compressor.

12. The method of claim 11, wherein unsealing the cylinder further comprises positioning the cylinder with both an intake valve and an exhaust valve coupled to the cylinder at least partially open.

13. The method of claim 11, further comprising either stopping operating the laser ignition source upon unsealing the cylinder, or maintaining operating the laser ignition source upon unsealing the cylinder for transporting cylinder gas to the sensor.

14. The method of claim 9, further comprising commanding open a wastegate positioned in a wastegate passage configured to route fluid flow around a turbine to transport heated cylinder gas to the sensor.

15. The method of claim 9, further comprising commanding closed an exhaust gas recirculation valve positioned in an exhaust gas recirculation passage of the engine, to transport heated cylinder gas to the sensor.

16. The method of claim 9, further comprising controlling a position of an air intake throttle and/or an exhaust tuning valve for transporting heated cylinder gas to the sensor.

* * * * *